United States Patent Office 3,305,850
Patented Feb. 21, 1967

3,305,850
SUPERVISORY APPARATUS
John Suozzo, Paramus, and Emmett J. Ward, Maplewood, N.J., Brian P. Ward, Manhattan Beach, Calif., and William R. Caputo, Jersey City, N.J., assignors to Westinghouse Electric Corporation, Pittsburgh, Pa., a corporation of Pennsylvania
Filed Nov. 7, 1963, Ser. No. 322,242
11 Claims. (Cl. 340—213.2)

This invention relates to the supervisory art and has particular relationship to protective supervisory systems and apparatus for monitoring a region such as a building or group of buildings for critical, usually undesirable, conditions. Typically a critical condition may be a fire somewhere in the region. Such a fire would be detected by a detector and might set off sprinklers. The sprinklers are also monitored. Such apparatus as post indicator valves, which for example control the water to the sprinkler system, are referred to in this application as supervisory equipment. In addition to monitoring for fire and burglary this invention concerns itself with industrial monitoring. For example, the systems according to this invention may serve to monitor the temperature of the bearings of industrial apparatus, for example, the bearings of the rolls of a cold-rolling mill. The apparatus may also monitor the level or the temperature of cooling water or of overflow or flood waters which must be maintained at a low level by pumping or locks.

The indication of the existence of a critical condition such as a fire or a burglary in the region is called in this application an "alarm"; the indication of the existence of a defect in supervisory equipment is called in this application a "supervisory alarm." Fire and burglar alarms and the like are referred to generally as "critical" alarms to distinguish them from supervisory alarms which are regarded as non-critical. Critical alarms take precedence over supervisory alarms in the practice of this invention. The various items of the aggregate which carries out the monitoring are individually referred to in this application generically as apparatus; the aggregate is called a "system." The monitored region is considered to be divided into areas each of which may have a number of detectors monitoring the region in common.

A supervisory monitoring system typically includes a detector or a group of detectors per unit in each area which is to be monitored. For example the system may be used in monitoring for fire a building including 50 areas in each of which there is a fire detector. Additional detectors are provided for monitoring the supervisory apparatus. For example, some of the areas in which there are fire detectors may also include sprinkler systems having a float valve for detecting low pressure or low level of the sprinkler water. The condition of this supervisory apparatus is monitored.

In addition to the detectors the monitoring system also includes an electical panel which may be described as an area panel into which the information derived by the detectors is fed electrically and which reacts in response to this information. An important function of the area panel is that it encodes the information from the detectors generating codes which may be transmitted as intelligence of the alarms. There may be one area panel for a number of detectors. Typically there may be an area panel for 50 detectors, 20 of which may detect alarms and 30 supervisory alarms. The area panel is usually maintained by service personnel which visit the panel periodically and also when called. The area panel is located in a position usually a short distance from the detectors.

The intelligence processed and encoded by each area panel is transmitted in the form of code to a corresponding console at a remote central position. The console produces visual and audible indications and is, normally, continuously monitored by an attendant who takes remedial action on the indication of an alarm. Each region may be served by a plurality of area panels each of which communicate with a corresponding console.

Broadly, it is an object of this invention to provide a reliable and effective system for monitoring for alarms and this invention arises from the realization that the systems in accordance with the teachings of the prior art and certain of the apparatus in such systems lacks the desired flexibility, simplicity, reliability and effectiveness.

A deficiency of the prior art monitoring systems is that the display at the console of an alarm which is observed by the attendant is not sufficiently striking to attract the attention of the attendant. In systems in accordance with the teachings of the prior art this display includes a plurality or visual indicators, usually lights, which may be deenergized normally and may become energized for an abnormal condition in any area under observation. Usually a large number of areas are under protection by each console and a bank of a large number of lights is viewed by the attendant continuously. The attendant is usually relatively unskilled and he may not readily detect a change of one light in the bank of a large number of lights particularly where several lights are already energized. Nor is the deenergization of an energized light of the bank on the restoration of the area to normal condition readily recognized.

So that undivided and continuous attention to the console may be assured it is necessary that the supervisors of the attendant be kept fully informed as to his concentration on the console. Systems in accordance with the prior art also do not include entirely reliable facilities for accomplishing this purpose and for determining if an attendant has been lax in concentrating his attention on the console. Another deficiency of the prior art is the connection between the detectors and the relays which operate when an alarm occurs. In prior systems a number of monitoring relay contacts are interposed in series with the coil alarm relays and the detector contacts. It has been discovered that mal-operation of the prior art systems occur because, as is probable, one or more of these series contacts corrodes or becomes dirty.

Prior art systems also do not include entirely effective facilities for providing an automatic replacement circuit on the occurrence of a fault or an open circuit.

It is an object of this invention to provide a monitoring system which shall not have the above deficiencies. A further object of this invention is to provide such a system in which the display shall be such that the occurrence of an alarm, or the restoration to normal conditions following an alarm, shall promptly and effectively attract the attention even of a relatively unskilled attendant.

A further object of this invention is to provide a monitoring system which shall include facilities for determining if the attendant's undivided attention has been continuously concentrated on the console.

A further object of this invention is to provide a monitoring system in which detectors of alarms shall be connected to the coils of the alarm relays in circuits substantially devoid of relay contacts.

In accordance with this invention a monitoring system is provided in which the console has two visual indicators for each protected area. These visual indicators are typically lamps and are disposed adjacent each other. Preferably one of these indicators is energized to indicate that a detector in the protected area has detected an alarm. This indicator may be called a detector-state indicator. In addition, there is a second visual indicator which indicates that a detector has changed state either from indicating a normal condition to indicating an alarm or from indicating an alarm to indicating restoration to a normal condition. The latter indicator may be called a detector-changed-state indicator. Usually these indicators are normally deenergized and become energized to convey their respective intelligence.

The responses of the detector-state and the detector-changed-state indicators to the restoration to normal condition following the occurrence of an alarm are different. The detector-state indicator responds automatically to the condition of the detector; if the detector is indicating an alarm it becomes energized; if it is indicating restoration to normal condition it automatically becomes deenergized. The detector-changed-state indicator once energized remains energized until deenergized by manual operation of an "acknowledge" button or switch by the attendant on the console adjacent to each detector-changed-state indicator. The detector-changed-state indicator calls attention of the attendant to a change in the state of the detector and assures that an attendant who is concentrating his attention on the console does not fail to recognize the occurrence of a change of state of a detector in the protected areas.

An important advantage of the detector-changed-state indicator is that it continually reminds the attendant that he must take action on an indication of an alarm or restoration. To take full advantage of this feature the attendants should be instructed to operate the "acknowledge" button to deenergize the detector-changed-state only after taking action on an alarm or restoration. If the attendant's attention is distracted by an intervening event, the detector-changed-state indicator acts as effective reminder. Thus, in many situations, the attendant has the duty of admitting people to a plant in addition to his duty of monitoring the console. An abnormal condition might occur simultaneously with the entry of a person through the gate guarded by the attendant. As the attendant turns to the person seeking entry he may forget about the alarm. The detector-changed-state lamp reminds the attendant that he must take action on the alarm. A like situation would occur if the attendant phoned to inform the assigned personnel of the alarm and found extension to be "busy." The detector-changed-state lamp would remind the attendant that he must still take the necessary action.

Since the detector-changed-state lamp remains energized until the acknowledge switch is actuated, the detector-changed-state lamp continues to be energized and remains energized even after the area under observation is restored to a normal condition, if the attendant fails to operate the acknowledge button just after he takes remedial action. Thus, there is no indication of detector-changed-state in a situation of this type but in this case the attendant is appraised of the changed-state by the extinction of the lamp indicating the detector-state and the sounding of the audible signal indicating restoration. In the preferred practice of this invention the visual indicators are constructed as individual modules with the detector-state and detector-changed-state lamps side-by-side. Each module is covered by a movable transparent plate of Lucite or like material which is mechanically connected to actuate the "acknowledge" switch or button. Thus, when the operator desires to acknowledge a visual indication of an abnormal condition, he simply touches the Lucite plate turning off the detector-changed-state indicator. The detector-state and the detector-changed-state visual indicators could be electroluminescent plates. The electroluminescent plate indicating the detector-changed-state could at the same time serve as the "acknowledge" switch.

The indicators which are used in the practice of this invention are lamps of the glow discharge type. In accordance with this invention, a novel energizing circuit for these lamps are provided. The lamps require approximately 200 volts for energization but once energized remain energized unless the voltage decreases below about 80 volts. The supply voltage used for the indicators in the practice of this invention is of the order of 140 volts. The additional voltage required for firing each lamp is provided by a capacitor which is maintained charged during standby and is discharged through each lamp circuit responsive to an alarm in the area corresponding to the lamp. Once the capacitor is discharged, the lamp is maintained energized by the supply voltage. The detector-state lamp may be deenergized by the relay which responds to the restoration to normal of the area corresponding to the lamp voltage substantially to zero; the lamp indicating detector-changed-state may be deenergized by closure of the "acknowledge" button or switch.

In accordance with another aspect of this invention, the connection between each detector of a critical alarm and the area panel is through four wires which are normally insulated from ground. On the occurrence of an open-circuit, or ground in any of the wires the system remains enabled through an alternative circuit.

The continuity of the four wires is monitored by a relay the coil of which is normally energized through the wires connected in series. If an open-circuit occurs in any wire, this relay drops providing alternative facilities for processing the actuation of the corresponding detector on the occurrence of an alarm and also providing indications of the open-circuit. Of the four wires, the wires of each pair are connected to each other so that the occurrence of a short-circuit between these does not change the operation of the system. Critical alarms are indicated by the closing of normally-open contacts of the detector. The wires between each detector and the area panel are connected across these contacts and are insulated from each other and a short-circuit between these wires would have the same effect as a critical alarm in the protected area and would be handled by the attendant at the console in the normal manner.

The system according to this invention includes automatic switching mechanisms which automatically assure detection and indication of alarms on the occurrence of faults or open circuits in the various parts of the system and particularly in the wires interconnecting the detectors and the area panels and the consoles. On the occurrence of faults alternative circuits are provided for transmitting the intelligence of alarms and for indicating the existence of such alarms. With these automatic switching facilities an unskilled attendant is enabled to monitor and operate the system without difficulty. In addition the intelligence of the faults are transmitted and indicated. Certain of the faults are transmitted as alarms. Facilities are also provided to enable service personnel to readily correct or remedy any faults or open circuits which occur and in a short time revert the apparatus according to this invention to normal operating condition.

The apparatus according to this invention also includes a printer or printing facility for automatically, and independently of the attendant, printing the intelligence of an alarm or fault soon after it occurs. On the occurrence of any alarm or fault the printing facilities typically print the numbers of detectors which detect the alarm or fault, the number of the area panel connected to this detector, the date and the time of the printing which is soon after the occurrence of the fault. On the occurrence of an alarm or fault the above-described data is typically printed in red. When the area is restored to normal and the detector responds to the restoration the restoration is printed in black. The printed data on the tape of the printer enables management personnel, insurance people and the personnel supervising attendants to determine how soon after a fault occurred the remedial action was taken and in addition, to an extent gives an indication of the effectiveness of the system.

In the system in accordance with this invention only one printer is usually provided for a number of area-panel-console units. The apparatus according to this invention includes memory facilities for printing intelligence of alarms which may have come in simultaneously or while a printer was in operation. The apparatus operates to produce a visual display of any alarm immediately on its occurrence. The printing takes place sequentially by area panel; that is, the different area panels are connected to operate the printer in a certain sequence and if alarms for two or more area panels are reported substantially simultaneously the intelligence of these alarms is printed in order corresponding to this sequence. The intelligence of the alarm then is not required to wait for the relatively slow printer to perform its operations.

The apparatus according to this invention includes "confirm" facilities which enable an operator to confirm all of the intelligence which has been received. To operate the confirm facilities the attendant need only press a "confirm" button. The printer prints the date of the confirmation again printing the detector number which is detecting an abnormal condition, the number of the area-panel connected to this detector and the date and the time of confirmation. If the area protected has not been restored to normal the confirmation is printed in red. Other modes of distinctions in printing may be used to distinguish alarms and restorations. For example intelligence of alarms may be printed in heavy type or capitals and intelligence of restoration in light type or small letters.

The confirm facilities provide management with means for checking the devotion of the attendants to the watching of the console. The attendants can be instructed by the management people to confirm all alarms. The time of confirmation is then printed on the tape and the management can determine by comparing the time of a confirmation with the time of the initially printed intelligence as to the alarm or fault how soon after the occurrence of an alarm or fault the attendant confirmed the alarm and thus at what time he knew of it.

The system according to this invention includes facilities for giving critical alarms precedence over non-critical alarms so that when a critical alarm occurs simultaneously with or shortly after a non-critical alarm the critical alarm is reported first.

The system also includes a test facility which enables the attendant to cause the complete system with exception of the detectors to test itself. On the actuation of the test switch all of the visual indicators and the alarms are operated in sequence and a record is printed of the test. So that insurance carriers may be satisfied, attendants can be asked to carry out a test periodically, for example, once every day. The printed tape would show that the tests have been carried out.

In the practice of this invention the area panel of a system operates responsive to actuation of a detector to scan the alarm circuit until it reaches the alarm circuit corresponding to the detector which detected an alarm. The console corresponding to this area panel scans in synchronism with the area-panel scanning operation. In accordance with this invention the synchronism between the area panel and the console is checked effectively and departures from synchronism are corrected. The intelligence of the departures are printed, and a lamp is illuminated.

In the practical application of systems according to this invention it is necessary that the requirements of the National Board of Fire Underwriters be met. This requirement is presented in the Underwriters Bulletin No. 72 for class A proprietary protective signaling systems. The system according to this invention meets the requirements of this Bulletin No. 72.

For a clearer understanding of this invention, both as to its organization and as to its method of operation, together with additional objects and advantages thereof, reference is made to the following description of a specific embodiment taken in connection with the accompanying drawings, in which.

Figure 1:
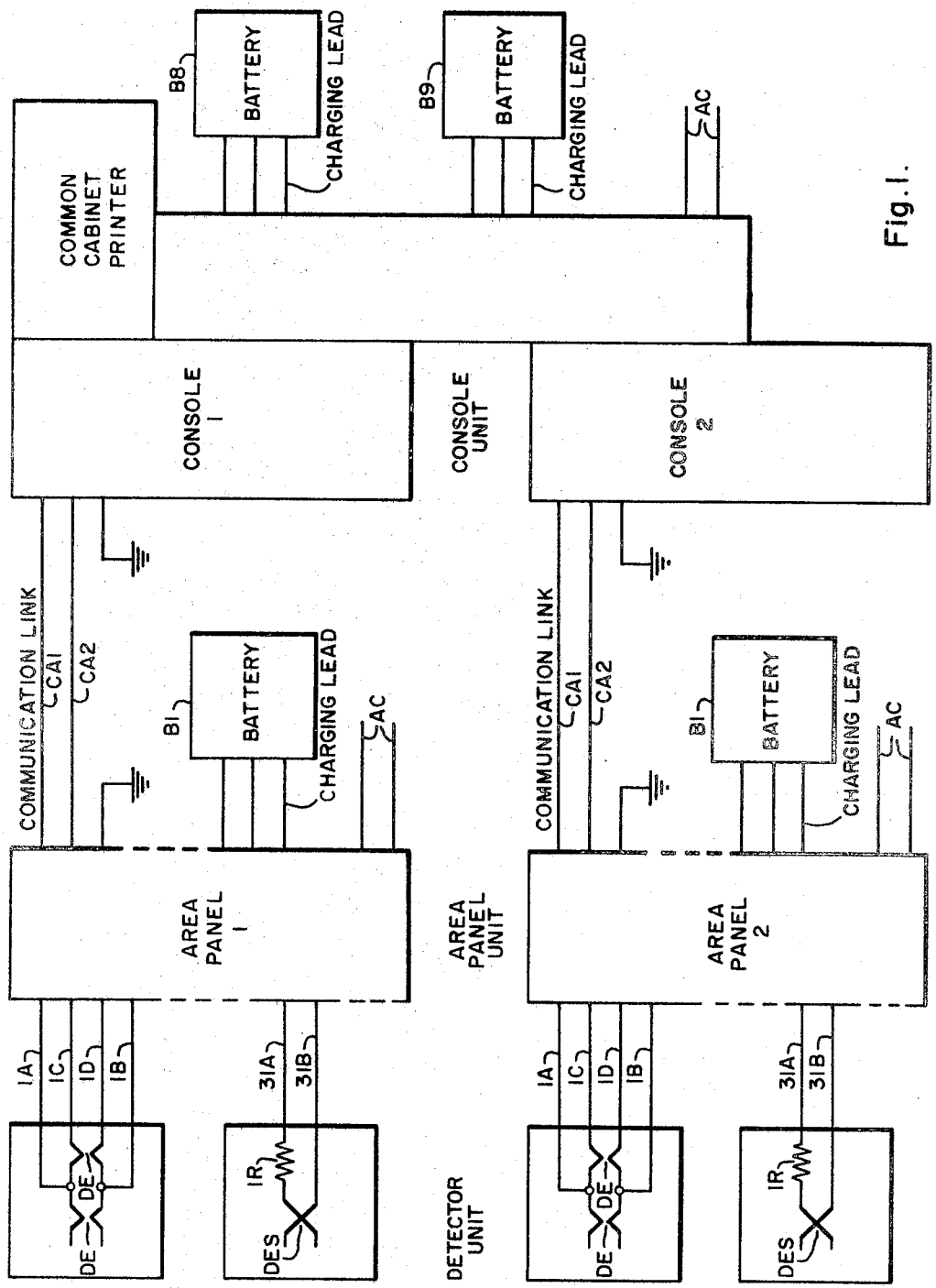
FIGURE 1 is a block diagram showing a system according to this invention.
Figure 2A:
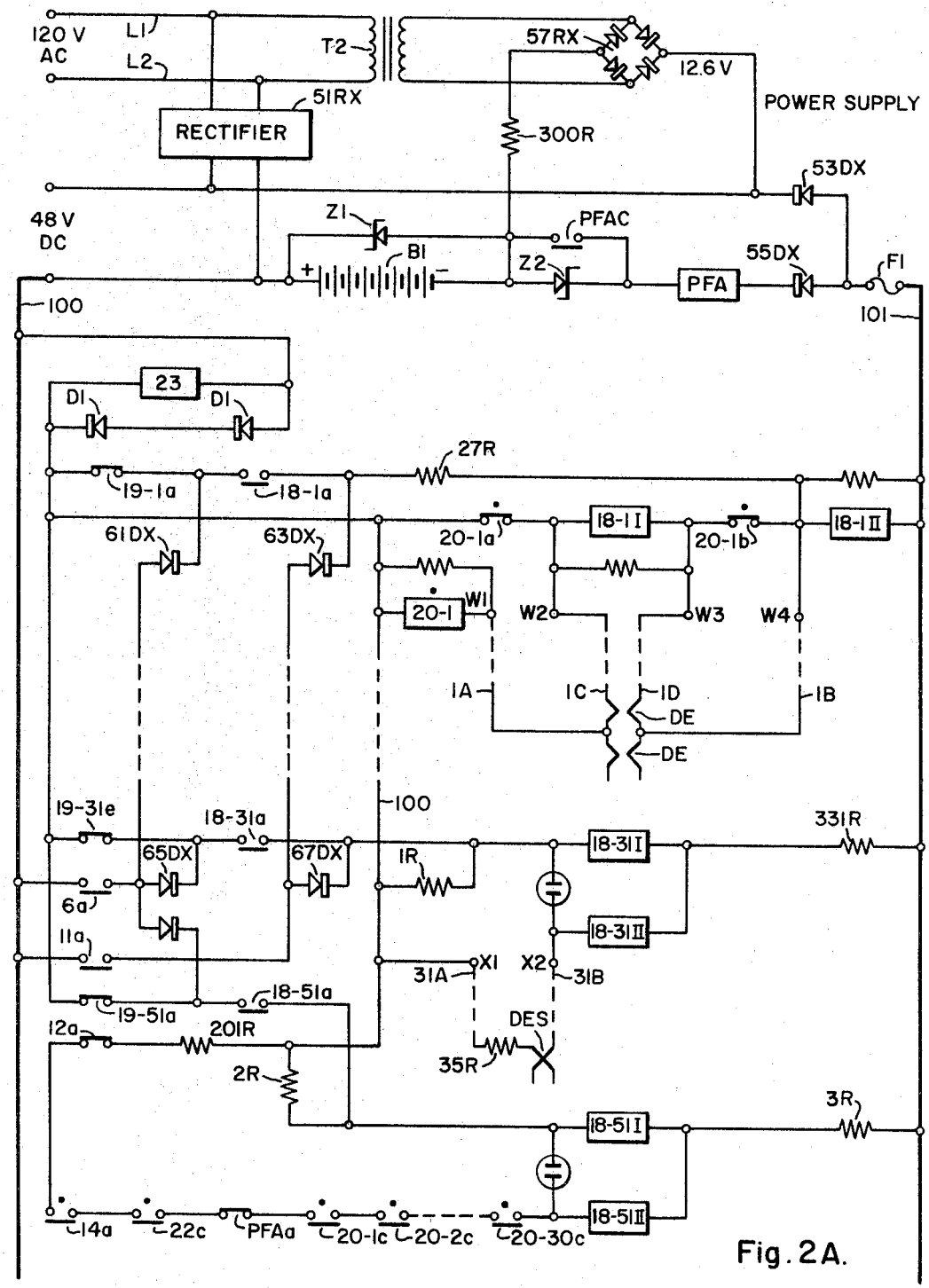
FIGS. 2A, 2B, 2C and 2D are a schematic showing of a typical area panel according to this invention.
Figure 2B:
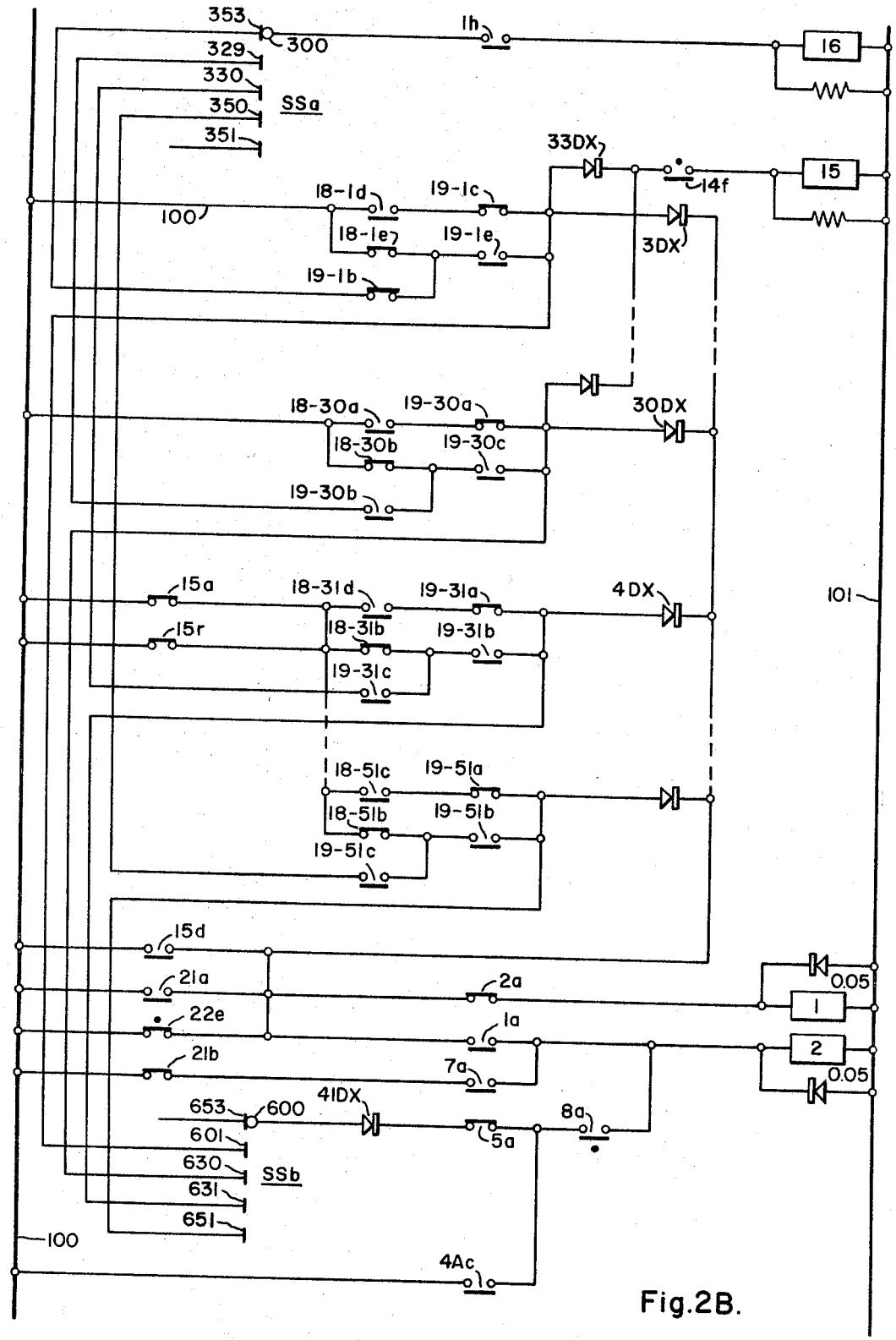
Figure 2C:
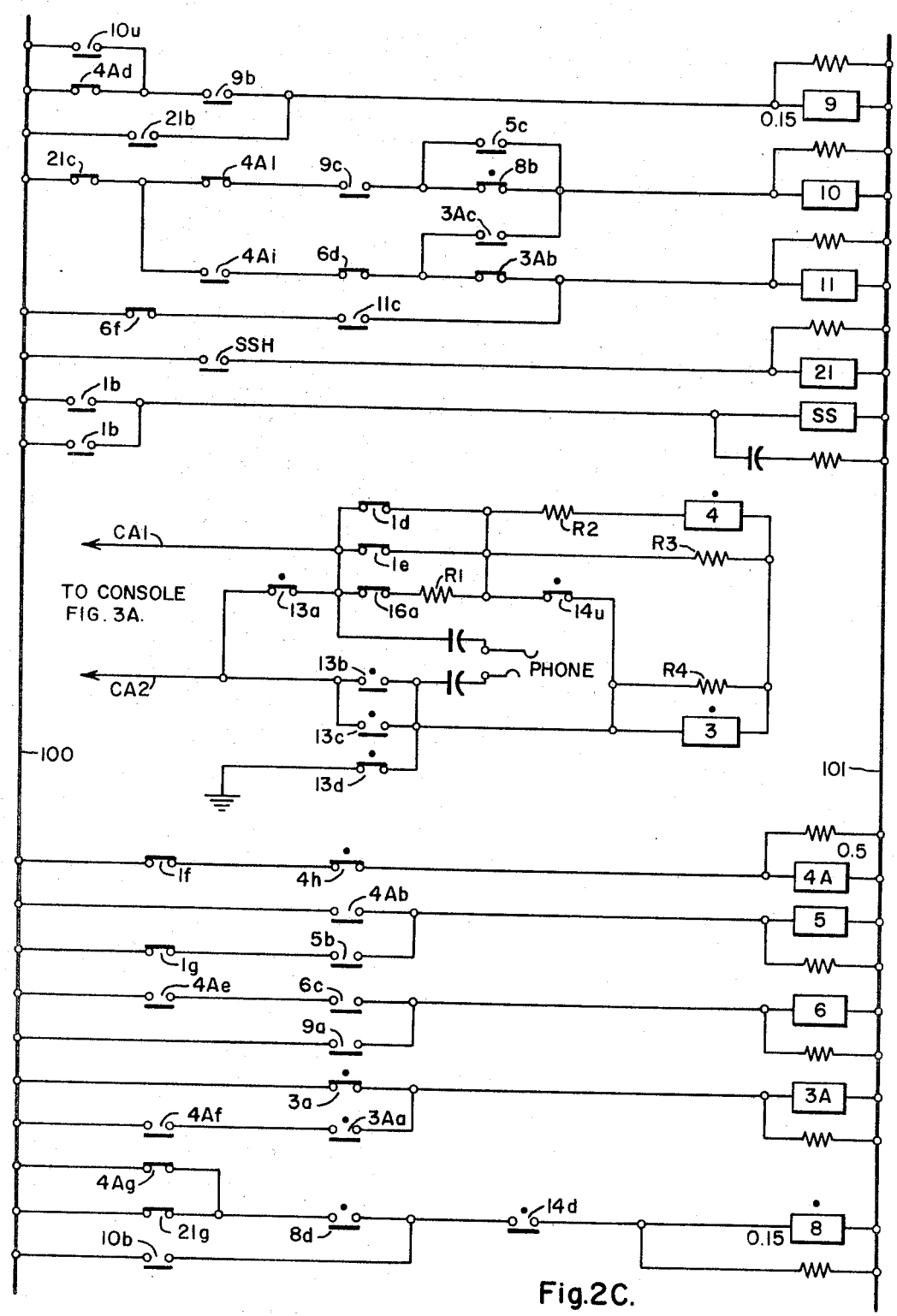
Figure 2D:
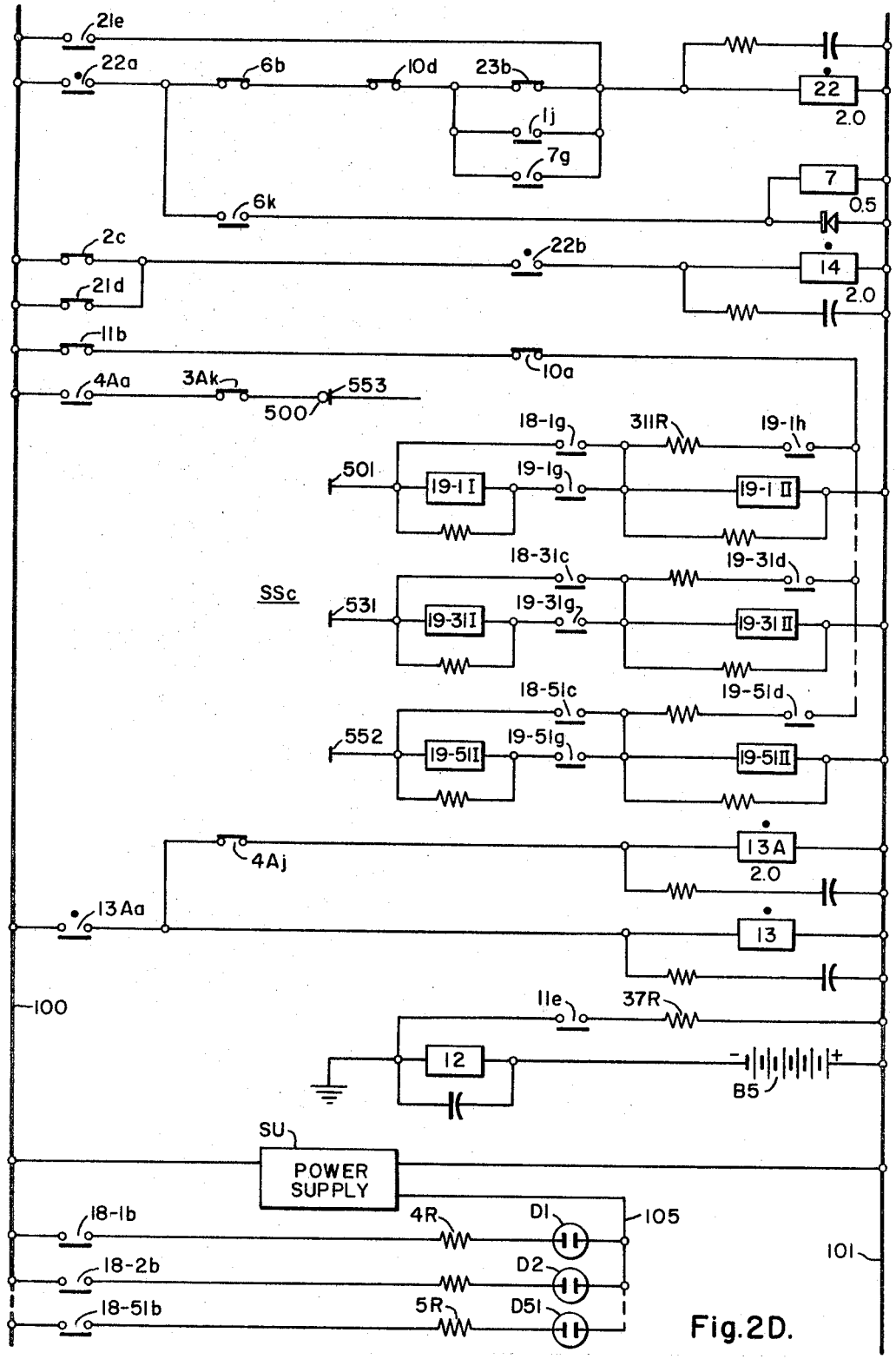

The apparatus shown in the drawings includes a DETECTOR UNIT, an AREA PANEL UNIT and a CONSOLE UNIT. The DETECTOR UNIT includes detectors of critical alarms and supervisory detectors. The critical-alarm detectors are distributed over the region which is protected and each detector responds to an alarm by closing contacts DE. The supervisory detectors are connected to the supervisory equipment, for example, the post indicator valves, and respond to conditions in such equipment which might prevent its operation by opening contacts DES.

The AREA PANEL UNIT may include one or a number of area panels each centrally located among its associated detectors to process the intelligence picked up by the DETECTOR UNIT. The CONSOLE UNIT includes a console for each area panel. In addition the CONSOLE UNIT includes a cabinet common to the consoles. This cabinet includes the printer and relays and indicators common to the consoles. The consoles labeled Console 1 and Console 2 in FIG. 1 and the common cabinet may be in a rack which may be constructed to accommodate a number of such elements. In the practice of this invention each area panel processes signals from detectors both alarm and supervisory in a DETECTOR UNIT. Where a larger number of detectors are included in the DETECTOR UNIT several area panels may be included in the AREA PANEL UNIT. In FIG. 1, two area panels labeled Area Panel 1 and Area Panel 2 are shown.

Each area panel is connected to the associated critical-alarm detector contacts DE (only No. 1 shown) through four ungrounded conductors. The conductors are labeled 1A, 1B, 1C, 1D for No. 1 detector, 2A, 2B, 2C, 2D for No. 2 (not shown) etc. Each area panel is connected to the contacts DES of the supervisory detectors through two ungrounded conductors. It is assumed that there are 30 critical-alarm detectors; the conductors to the first supervisory alarm which is the only one shown are labeled 31A and 31B. It is preferred that the conductors for critical-alarm detectors 1A, 1B, 1C, 1D, etc. should not be at a higher voltage than 50 volts relative to ground, should not conduct more than $\frac{1}{10}$ ampere current, and should have a resistance not exceeding 50 ohms.

The area panel is energized from the usual single phase, commercial alternating-current supply which typically should be fused so that the current supplied does not exceed 3 amperes. For the eventuality of failure of the alternating-current supply a battery B1 is provided. This battery should be capable of delivering 10 amperes at 50 volts. Each area panel includes facilities for charging the battery B1. The battery B1 when fully charged should be capable of operating the area panel for approximately 24 hours. The ground current from the area panel should not exceed $\frac{4}{10}$ of an ampere.

Briefly stated each area panel has the following functions:

(1) Transmits intelligence to console:
  (a) that detector has entered the off-normal state,
  (b) that detector has been restored to the normal state,
  (c) that it is unable to transmit intelligence (regardless of cause, including complete power failure).

(2) Receives information from console:
  (a) that alarm was printed, (b) that alarm was not printed,
(c) that scanning at console has returned to home position,
(d) to carry out a test operation on "Test" command from console,
(e) to confirm intelligence of an alarm on "Confirm" command from console.

(3) Operates all detector circuits on "Test" command from console. The normal operating system, exclusive of detector contacts is thus tested.

(4) Reports state of all detectors on "Confirm" command from console.

(5) Display all off-normal detectors.

(6) Maintains stand-by batteries charged. Switches instantly to stand-by batteries on power failures. Sends supervisory alarm, lights lamp. Operates for 24 hours on batteries if necessary.

(7) Remains functional (displays off-normal detectors) with no communication with console.

(8) Monitors the communication link between area panel and console. Normally this communication is over a pair of ungrounded wires. In the event of the failure of one wire, the communication is between the other wire and ground.

(9) Provides alternative circuits for detecting existence of an alarm.

(10) Monitoring critical-alarm circuits. This communication is over four wires. An open or a grounding anywhere is reported as an electrical fault and the alarm circuits continue to function to detect alarms. A short-circuit across critical contacts is reported as a critical alarm.

(11) Monitors non-critical (supervisory) alarm circuits. This communication is over two wires. An open or a short circuit is reported as an alarm. A ground is reported as an electrical fault.

The reporting by each area panel has the following features:

(1) Alarms are reported immediately as they occur. They are reported repeatedly approximately once every ten seconds until they are printed and the synchronization between the area panel and console is checked out.

(2) Restorations are reported similarly to alarms.

(3) Alarms can be re-reported as often as desired on "Confirm" command from the console.

(4) A report of failure to transmit when an alarm exists, is sent to the console about 2.5 seconds after receipt of the alarm if there is a transmission failure.

(5) Transmission of reports proceeds on failure to receive a "synchronization check" after an alarm within two seconds of the set time.

(6) Transmission of reports proceeds on failure to receive a "continue" signal within 2 seconds of the set time after alarm.

(7) All information is repeated until synchronization is checked out. No information is destroyed until it is reported and printed correctly and the alarm no longer exists.

The CONSOLE UNIT may include a number of consoles 1 and 2 each corresponding to an area panel 1 and 2 respectively. Console 1 is connected to area panel 1 and console 2 to area panel 2. The connection between each area panel and each console is through a pair of ungrounded wires CA1 and CA2 which may be leased telephone lines. The voltage of each wire CA1 and CA2 with respect to ground typically should not exceed 70 volts and the current conducted by each wire typically should not exceed $\frac{1}{10}$ of an ampere. Typically the resistance of each wire should not exceed 250 ohms.

The consoles are typically mounted on a rack. This rack also includes a cabinet for the printer which is common to all the consoles. This cabinet includes a number of relays common to all the consoles and is connected to contacts of the corresponding relays in the respective consoles.

The consoles are normally supplied with power from a single-phase commercial alternating-current supply having a nominal voltage of 120 volts and fused to deliver not more than three amperes. For the eventuality of a failure of the alternating-current supply batteries B8 and B9 are provided. Battery B8 should be capable of delivering no more than 10 amperes at 50 volts and battery B9 should be capable of delivering no more than $\frac{3}{10}$ amperes at 150 volts.

Briefly described the console has the following features:

(1) Receives intelligence from area panel:
(a) that detector has entered the off-normal or alarm state,
(b) that detector has been restored to the normal state,
(c) that the area panel is unable to transmit.

(2) Transmits intelligence to area panel:
(a) to continue operation after alarm is printed,
(b) to continue operation when alarm was not printed,
(c) that its scanning is in the home position,
(d) to carry out a test (test Command),
(e) to confirm (Confirm Command).

(3) Operates all alarm relays in area panel on "Test" command. The normal operation system, including lamps but exclusive of detector contacts, is tested. Any alarms which may occur during test are reported immediately after test.

(4) Determines state of all detectors on "Confirm" command.

(5) Displays visual indications of state and change of state of detectors, area-panel electrical defects, area panel tamper, console electrical defects, loss of synchronization, line faults, and pulsing from area panel. The indicators are lamps normally deenergized, except the pulsing lamp (one per console), but energized to indicate an alarm or a change-of-state of a detector. The pulsing lamps are normally energized and repeatedly go out during the pulse signalling. These lamps may show that the pulsing is defective or erratic. These lamps also show if the power is on since they are deenergized when the power is off. They also are deenergized on the failure of the communication link. The change-of-state indicators are maintained energized until deenergized by closing the "acknowledge" buttons which are associated with each detector. The synchronization button resets the out of synchronization lamp.

(6) Sounds fire bell, supervisory buzzer, console electrical defect buzzer.

(7) Prints number of alarm and area panel along with day of month and time. Intelligence of off-normal or alarm conditions are printed in red, and restoration in black.

(8) Prints intelligence "line fault," "out of sync," or "test" along with area panel, day of the month, and time.

(9) Maintains stand-by batteries charged. Switches instantly to batteries for power failure; sounds buzzer and lights lamp. Operates for 24 hours on batteries if necessary.

FIGS. 2A–2D disclose a typical area panel. This panel includes a number of relays. It is desirable at outset to describe the identification and the manner of coding of these relays.

The relays in the area panel are identified by numbers. The coils of the relays are represented by rectangles and the numbers usually appear in, or adjacent to, these rectangles. Relays having only a single coil are identified by a single number. The coils of a relay which has two coils are identified by an Arabic number followed by Roman numerals; one of two coils being designated by I and the other by II. Thus, the two coils of relay 18–1 are identified as 18–1 I and 18–1 II.

Each area panel includes separate alarm and restore circuits and each circuit includes an alarm relay and a reported relay. The relays of the different alarm circuits are designated by the number 18 followed by a succession of Arabic numerals from 1 through the number of alarm circuits. Thus, the relay of the first alarm circuit is designated, 18–1, the relay for the second 18–2, etc. For the 50 detectors the alarm relays are designated 18–1 through 18–50. The reported relays are designated 19–1 through 19–50. In referring generally to a relay of an alarm or restore circuit, designation 18–F or 19–F is used for a relay numbered F and 18–(F+1) or 19–(F+1) for the succeeding relay. For fault or other defect detection a relay 18–51 is provided. In addition there may be a tamper relay 18–52 (not shown) which operates when the door to the area panel is opened.

The contacts of the relays are identified by a lower case letter following the number of the relay. Thus, relay 1 may have a number of contacts 1a, 1b, 1c and the like. Relays which are energized in the stand-by condition of the area panel and their contacts are identified by a dot adjacent the rectangle designating the coil or the symbol designating a contact of the relay. By reference to the dots the reader can determine which of the contacts are closed in the stand-by condition of the apparatus and which are open. Each area panel also includes a step-switch which is designated SS rather than by a number. The step-switch SS has a number of banks of contacts usually one for each detector. The contacts of the different banks of step-switches are designated by three digit numbers, for example 301–350. The banks are identified by SS followed by a small letter, for example SSa, SSb, SSc. Some of the relays in the area panel are timing relays; they drop-out a predetermined time interval after their respective coils are deenergized. Such relays are identified by decimals or numbers 1 or 2 adjacent their coil symbols. The number is the time taken by the relay to drop-out.

The functions of the various relays of the area panel are presented in the following table:

| Relay | Function |
| --- | --- |
| 1 | Normally deenergized—Conditions or cocks the spring of SS to operate through 1 step when energized. |
| 2 | Normally deenergized—Deenergizes 1 to cause SS to operate through one step if previously conditioned by 1. |
| 3 | Normally energized—Decodes a signal from the console. This relay is energized in the circuit which communicates signals between the console and the area panel and becomes deenergized when the current in the communication circuit drops to zero magnitude during a pulse interval. |
| 3A | Normally deenergized—Becomes energized when 3 becomes deenergized. This relay is a slave relay which operates to translate to code from the console. |
| 4 | Normally energized—Decodes a signal from the console. This relay is energized in the communication circuit from the console. Becomes deenergized responsive to a decrease of the current to a lower magnitude or to zero during a pulse. Relay 4 operates for all pulses transmitted from the console to the area panel through the communication circuit and relay 3 only for those pulses for which the current drops to zero. |
| 4A | Normally deenergized—This relay is a slave relay similar to 3A which becomes energized when 4 is deenergized. |
| 5 | Normally deenergized—Operates to advance the sequence. Controls relay 2 stops the step-switch SS when the step-switch arrives at a contact corresponding to the area in which an alarm exists. The energization of this relay prevents this stop circuit through relay 2 from being closed and this would occur either if 1 is still energized or if relay 4A remains energized. |
| 6 | Normally deenergized—Also advances the sequence—Becomes deenergized when SS reaches the home position causing subsequent operations to take place. Cooperates in the synchronization of the console step-switch ST. |
| 7 | Normally deenergized—Causes SS to pause in the home position .5 second. Thus cooperates in synchronization of step-switch ST at console. |
| 8 | Normally energized—Deenergized if SS is out of synchronization away from home. If this relay is deenergized the step switch SS cannot stop for any alarms but proceeds directly to the home position. |
| 9 | Normally deenergized—Energized when step-switch SS is away from home—Deenergized responsive to a signal indicating that the step-switch ST at the console is "At Home" and is in synchronism with SS and starts the sequence to reset the area panel. |
| 10 | Normally deenergized—Energized during a confirm cycle to drop-out the reported relays 19 which drop-out the alarm relays 18. Also energized, after an out of synchronization occurs to cause a retransmission. |
| 11 | Normally deenergized—Energized to energize the alarm relays 18 during "test." |
| 12 | Normally deenergized—Becomes energized on short-circuit to ground, or on "test" command to test relay 12 and associated battery. |
| 13 | Normally energized—Controls lines CA1 and CA2; when energized permits flow of pulses between console and area panel normally through lines CA1 and CA2. When this relay is deenergized alternative paths through ground are provided for communication between console and area panel. |
| 13A | Normally energized—Locks in 13—Becomes deenergized on shorting of one of lines of communication lines CA1 and CA2 or open-circuit in these lines. When 13A is deenergized it may be re-energized by the personnel servicing of the area panel. The service man presses the armature of 13A inwardly closing the circuit through 13A and through the armature. This in turn energizes 13. |
| 14 | Normally energized—When deenergized drops out after a substantial interval (2 seconds). This relay when deenergized operates to restart the step-switch SS if it stalls away from the home position. Usually such stalling is caused by the failure of relay 2 to drop out. This realy starts 2 operating again. |
| 15 | Normally deenergized—Energized to give intelligence as to a critical alarm priority over intelligence as to a non-critical alarm. |
| 16 | Normally deenergized—Energized responsive to the return of alarm contacts DE or DES to normal state indicating that protected area has been restored to normal conditions. |
| 18–1 through 18–51, general designation 18–F. | Normally unactuated—Alarm relays actuated on the operation of an alarm contact DE or DES—Initiates the processing of intelligence that an alarm exists. |
| 19–1 through 19–50, general designation 19–F. | Normally deenergized—Reported and printed relays—Energized and actuated after intelligence of abnormal condition has been printed. Actuates relay 16 to start resetting of area panel following restoration to normal. |
| 20–1 through 20–51, general designation 20–F. | Normally energized—Becomes deenergized on the presence of an open wire in the four wire connection (1A, 1B, 1C, 1D, etc.) from the critical contacts alarm DE to the area console. |
| 21 | Normally deenergized—Energized when step-switch SS is away from home. |
| 22 | Normally energized—Deenergized after two seconds on the failure of area panel to receive a signal from the console that the step-switch ST at the console has returned to the home position or that the area panel is unable to report an alarm. |
| 23 | Normally deenergized—Energized on intelligence of an alarm. If an alarm is unreported 23 permits 22 to time out after two seconds indicating that the alarm has not been reported. Timing out of relay 22 actuates relay 1 to start a cycle of step-switch SS. Relays 23 and 15 provide alternative circuits for detecting that an alarm is to be reported in the eventuality of a failure of the normal circuits. |

As shown in FIGS. 2A–2D, the area panel is supplied with power through the 120 volt alternating current conductors L1–L2. These conductors operate through a full wave rectifier 51RX and diode 53DX to supply a potential of 48 volts direct-current between the conductors 100 and 101. Diode 53DX serves to isolate the power supply in the event that it develops a short circuit.

The power supply also includes a storage battery B1, the positive pole of which is connected to the conductor 100. The conductor 101 is connected to the negative terminal of the battery B1 through a diode 55DX, the coil of a relay PFA, and a Zener diode Z2. On the failure of the alternating current supply, the conductors 100 and 101 are supplied through the diode 55DX, the coil PFA and the Zener diode Z2. The relay PFA is actuated to set the apparatus for battery operation. The battery is charged from the rectifier 51RX in series with a rectifier 57RX supplied from the 120 volt input leads through a transformer T2. The charge is regulated by a Zener diode Z1 connected in series with a resistor 300R across the resultant rectifier voltage.

The area panel has indicating lamps which are energized from conductor 105. This conductor is energized from the Lamp Power Supply SU. SU may include a vibrator and a transformer for attaining the lamp voltage.

The alarm relays are typified in FIG. 2A-2D by the relays 18-1 and 18-31 and 18-51. Relays such as 18-1 serve to detect critical alarms such as fires and relays such as 18-31 serve to detect supervisory alarms.

In addition to the alarm relays 18-1 through 18-50 there are relays which operate in the event of a fault in the event of a tamper (relay not shown). Relay 18-51 operates in the event of a fault. This relay is connected similarly to the relays 18-31 through 18-50. The relay 18-1 has two coils 18-1 I and 18-1 II. The coils are connected between the conductors 100 and 101 through the back contacts 20-1a and 20-1b of the relay 20-1, at start up or during continuity failure in the alarm circuit. The detector contacts DE from the area protector are connected to the coils 18-1 I and 18-1 II through a four wire connecting link. The four wires are 1A, 1B, 1C and 1D. The contacts DE are connected across the coil 18-1 I through the wires 1C and 1D. The contact 20-1a is shunted by the coil of relay 20-1 and by wires 1A and 1C. The contact 20-1b is shunted by wires 1D and 1B.

When the area panel is put into service or after a fault which causes 20-1 to drop-out, the service personnel presses the armature of 20-1 opening contacts 20-1a and 20-1b. Relay 20-1 is then energized in circuit 100, 20-1, 1A, 1C, 18-1 I, 1D, 1B, 18-1 II, 101. 20-1 remains energized as long as wires 1A, 1B, 1C and 1D and coils 18-1 I and 18-1 II are continuous and not in any way disconnected. With contacts 20-1a and 20-1b open there is a circuit as follows through the coils of relay 18-1. 100, 20-1, 1A, 1C, 18-1 I, 1D, 1B, 18-1 II, 101. The ampere turns through 18-1 I and 18-1 II are balanced so that the relay 18-1 normally remains unactuated. When the critical alarm contacts DE close these contacts shunt 18-1 I and the current through 18-1 II actuates the relay.

If any of the conductors 1A, 1B, 1C or 1D is opened relay 20-1 is deenergized, contacts 20-1a and 20-1b close. In this case the coils of 18-1 are supplied in circuit 100, 20-1a, 18-1 I, 20-1b, 18-1 II, 101. With contacts DE open, the current through the two coils is balanced and the relay is unactuated. When DE closes, the current through coil 18-1 I is shunted and the relay is actuated. Thus, if there is an open circuit in the conductors 1A, 1B, 1C, 1D, the area panel is still capable of detecting a critical alarm. The short circuiting of 1C and 1D produces the same effect on relay 18-1 as an alarm. The short circuiting of 1A and 1C or 1B and 1D has substantially no effect and the short circuiting of 1A and 1D or 1A and 1B or 1B and 1C would produce an alarm. Grounding of any of the wires is detected by the ground detecting relay 12.

The coil 18-1 II of relay 18-1 is provided with a lock-in circuit as follows: 100, coil of 23, 19-1a, 18-1a, resistor 27R, 18-1 II, 101. Relay 23 is energized. Once coil 18-1 II is locked in in this circuit relay 18-1 remains actuated even if the contact DE opens. The following additional lock-in circuit is also provided for the coil 18-1 II: through contact 6a of relay 6 when relay 6 is energized: 100, 6a, diode 61DX, 18-1a, 27R, 18-1 II, 101. This lock-in circuit prevents 18-1 from dropping out once actuated unless relay 6 has become deenergized; relay 6 becomes deenergized when the step-switch SS reaches the home position and step switch ST at the console is in synchronism with SS. Relay 18-1 may be deenergized by the opening of all holding circuits while contacts DE is open. An additional circuit through 18-1 II is as follows: 100, 11a, diode 63DX, 27R, 18-1 II, 101. In this circuit relay 18-1 is actuated on actuation of relay 11 independently of the detectors DE when the "Test" command is given.

Relay 18-31 has two coils 18-31 I and 18-31 II. These coils are connected in parallel and their ampere turns balance when both are energized. Coil 18-31 I is connected in the following circuits: 100, a resistor 1R, 18-31 I, a resistor 331R, 101. 18-31 II is connected in the following circuit: 100, conductor or wire 31A, a resistor 35R, closed contact DES, conductor 31B, 18-31 II, the resistor 331R, 101. Normally, with DES closed 18-31 I and 18-31 II both draw currents inversely proportional to their turns ratio and the relay is unactuated. When contact DES opens on the occurrence of a supervisory alarm the current through 18-31 I increases and the current in 18-31 II is reduced to zero and the relay is actuated. Under such circumstances the relay is locked in in circuit 100, coil 23, 19-31e, 18-31a, 18-31 I, 331R, 101. The coil 18-31 I is also locked-in through the contact 6a and a diode 65DX. The coil 18-31 I may also be supplied with current through contact 11a, and a diode 67DX during test.

The coil 18-51 I is connected in circuit 100, 2R, 18-51 I, 3R, 101. The coil 18-51 II is connected in circuit 100, 201R, the contacts 12a, 14a, 22c, PFAa, 20-1c, 20-2c, 20-3c (and the additional contacts of all other relays 20 for additional alarm circuits), 18-51 II, 3R, 101. Normally, relay 18-51 similarly to relays such as 18-31 is maintained unactuated because the ampere turns in the two coils 18-51 I and 18-51 II are balanced and counteract. On the opening of any of the fault contacts 12a, 14a, 22c, PFAa, 20-1c, etc. the current flow through 18-51 II is interrupted and the relay operates locking itself in in circuit 100, 23, 19-51a, 18-51a, 18-51 I, 3R, 101.

A visual indicator is associated with each alarm relay 18. Typically, these indicators are energized when the relay is actuated. Typically, the indicator D-1 for relay 18-1 is connected in circuit 100, 18-1b, resistor 4R, D-1, 105. Similarly, indicator D-51 is connected in circuit 100, 18-51b, 5R, D-51, 105. Thus, there is a visual indication of alarms or faults at the area panel.

The step-switch SS is actuated by the energization and deenergization alternately of the relays 1 and 2. Relay 1 is connected to be energized on the actuation of any of the 18 relays. Typically, the coil of relay 1 is connected in the following circuit for energization when relay 18-1 is actuated, 100, 18-1d, 19-1c, diode 3DX, 2a, 1, 101. Similarly, 1 is connected to be actuated on the actuation of relay 18-31 in circuit 100, 15a, 15r in parallel 18-31d, 19-31a, diode 4DX, 2a, 1, 101. On the actuation of relay 1, relay 2 is energized through contact 1a in circuits similar to relay 1 and including the actuated contacts of the 18 relays. Contact 2a in the circuit of the coil of relay 1 has been opened and relay 1 is deenergized. The step-switch has an actuating mechanism which is operated by a spring. The actuation of relay 1 cocks the spring and the actuation of relay 2 deenergizing relay 1 releases the spring to advance the step-switch one step.

The step-switch SS has a number of banks which are labeled in FIGS. 2A-2D by the designations SSa, SSb, SSc. Each bank has a wiper and as the step-switch is operated each wiper passes over the 53 contacts which are labeled 601, 602-653 for SSb; 301, 302-353 for SSa; 501, 502-553 for SSc. The bank SSb starts in the home position with contact 653 which is not connected in the circuit and then passes through contacts 601 through 652 which are connected to a succession of points in the circuit corresponding to the alarm relays 18 and the reported relays 19. The bank SSa is essentially set one step ahead of the bank SSb. Its contacts are connected at points in the circuit corresponding to the 18 and 19 relays. In the home position the bank SSa is capable of being connected in the following circuit: 100, 18-1e, 19–1b, 353, 300, 1h, 16, 101. In the first step after the home position the bank SSa connects the relay 16 to be actuated through the back contact 18–2 (not shown) and the back contact of 19–2 (not shown) and so on. The wipers 600 and 300 of banks SSb and SSa move together so that the bank SSa operates the circuits in cooperation with the contacts of relays 18 and 19 one step ahead of the bank SSb. Typically when the bank SSb is set to cooperate at step F with the contacts of 18–Fa and 19–Fa, bank SSa is set to operate in cooperation with the contacts of relays $18-(F+1)_a$ and $19-(F+1)_a$.

The third bank SSc is similar to the bank SSb having a disconnected home contact and having a series of connected contacts 501–552. The step-switch SS also has a home contact SSH which is open in the home position and closed when the step-switch SS is away from the home position. This contact SSH is connected in circuits 100, SSH, 21, 101 to energize relay 21. Thus relay 21 is energized with the step-switch SS away from the home position.

The bank SSb is connected to hold relay 2 when the step-switch arrives at the position corresponding to the actuated alarm relay 18. Thus if relay 18–30 is actuated the step-switch is connected to maintain relay 2 energized in the following circuit: 100, 18–30a, 19–30a, contact 630 of the bank SSb, wiper 600 diode 41DX, 5a, 8a, 2, 101. When relay 2 is actuated through bank SSb it opens contact 2a stopping the stepping operation until the step-switch SS is to advance.

Bank SSa is connected to energize relay 16 one step ahead of bank SSb. Relay 16 is thus energized one step before bank SSb arrives at the point at which relay 2 is energized through bank SSb if a restoration is to be reported. For example, if alarm relay 18–30 is initially actuated relay 16 is actuated after a restoration (18–30 deenergized; 19–30 energized) when bank SSa arrives at contact 329 in the following circuit: 100, 18–30b, 19–30b, 329, 300, 1h, 16, 101. Thus 16 is conditioned for operation before relay 2 is actuated through bank SSb to stop the stepping operation.

The bank SSc is set to operate the reported relays 19. The 19 relays each have two coils. The step-switch SS cooperates with those 19 relays which correspond to the 18 relays. On the actuation of an 18 relay the corresponding 19 relay is actuated when the bank SSc arrives at the contact corresponding to the 18 and 19 relays after the receipt of a "continue" signal. Thus if relay 18–31 is actuated the corresponding relay 19–31 will be actuated when the bank SSc arrives at contact 531 in the following circuits: 100, 4Aa, 3Ak, 500, 531, 18–31c 19–31 II, 101. 19–31 operates to indicate that the message of an alarm has been printed.

*Communication link*

Communication with the console is effected in the area panel by the operation of relays 3 and 4. These relays are connected to be energized through conductors CA1 and CA2 which may be ordinary telephone lines. Conductors CA1 and CA2 derive their power from the supply busses 200 and 201 in the console (see FIG. 3A). The flow of power is controlled by the contacts of the relays 13 in the area panel and Y in the console. The relay 13A in the area panel is actuated by pressing its armature and is locked in through 13Aa. Relay 13A is connected between conductors 100 and 101 through 13Aa and 4Aj, and relay 13 is energized by 100, 13Aa, 13, 101. 13A is a delay relay which drops out about two seconds after contact 4Aj is opened; that is, if relay 4A remains energized continuously for 2 seconds. Relay Y is energized similarly to 13 during the stand-by setting of the console.

Normally with relays 13, 14 and Y energized, the communication link extends as follows: Starting at the conductor, 200, resistor RA, Yb and Yc in parallel, CA2, to the area panel, at the area panel 13b, 13c in parallel, 3, 4, resistor R2, 1d, 1e in parallel, CA1, to the console, at the console, J, I, II, Ab and Ac in parallel, 201. This communication link is powered by conductors 200 and 201. Contacts 16a and resistor R1 are in parallel with 1d and 1e. When relay 1 is actuated while 16 remains deenergized, 1d and 1e are open and the current in the communication link flows through R1 and 16a and is substantially reduced. This current remains reduced so long as 1 remains actuated. When both 16 and 1 are actuated the current in the communication link is reduced to zero so long as they remain actuated. Relay 1 operates during the stepping and drops out 50 milliseconds after its coil is deenergized; that is 50 milliseconds after 2 is energized. Relay 1 is re-energized 50 milliseconds after 2 is deenergized. During normal stepping of switch SS at the area panel then, the repeated energization and deenergization of relay 1 results in the transmission of reduced pulses of about 50 milliseconds duration and a repetition rate of 10 pulses per second.

At the console these pulses which are between lower and higher magnitudes operate as signals causing actuation of relay I but not dropping out of relay J. At the area panel, these reduced current pulses cause relay 4 to drop out. But this has no effect. Relay 4 initially performs its functions by energizing relay 4A when it drops out, but during a scanning operation energization of relay 4A is prevented when relay 1 is energized because 1f is open.

When 16 is energized, the actuation of relay 1 produces a pulse of 0 magnitude and of 50 milliseconds duration. This pulse operates as a signal causing actuation of relay I and dropping out of relay J at the console. At the area panel relay 3 and relay 4 drop out while 1 and 16 are energized. In this case relay 4A fails to operate for the reasons given. Relay 3 causes relay 3A to be energized by the closing of 3a. But relay 3A is not locked in because 4Af is open. Contacts 3Ac and 3Ab are in series with 4Ai and contacts 3Ak are in series with open contact 4Aa. Actuation of relays 3A and 4A then do not produce operation.

The coil of relay 12, the ground detecting relay, is connected to ground at one terminal and through battery B5 to supply conductor 101 at the other terminal. The battery is connected with its negative pole to the coil of 12 and its positive pole to 101 making the terminal of relay 12 connected to the battery the most negative point in the area panel. Conductors 100 and 101 are normally floating so that the circuit through the coil of 12 is not completed and 12 is normally deenergized. If either conductor 100 or 101 or any intermediate point which is in a continuous path to 100 or 101 is grounded the circuit through the coil of 12 is completed and relay 12 is actuating producing indication of this fault. Relay 12 also operates on "test" command through battery B5, 101, 37R, 11e, coil 12.

Figure 3A:
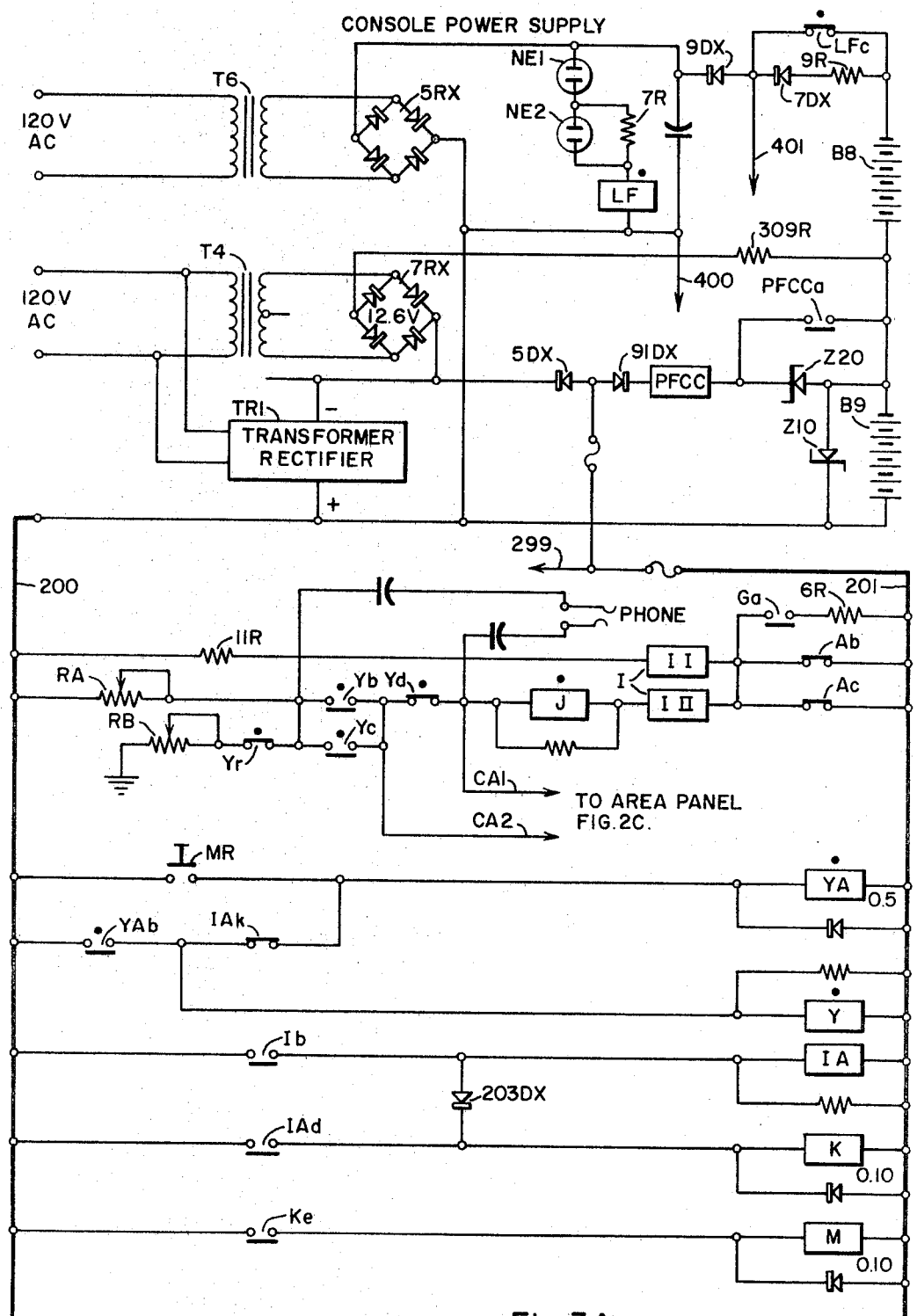
FIGS. 3A, 3B, 3C, 3D, 3E, 3F and 3G are a schematic showing of a typical console according to this invention.
Figure 3B:
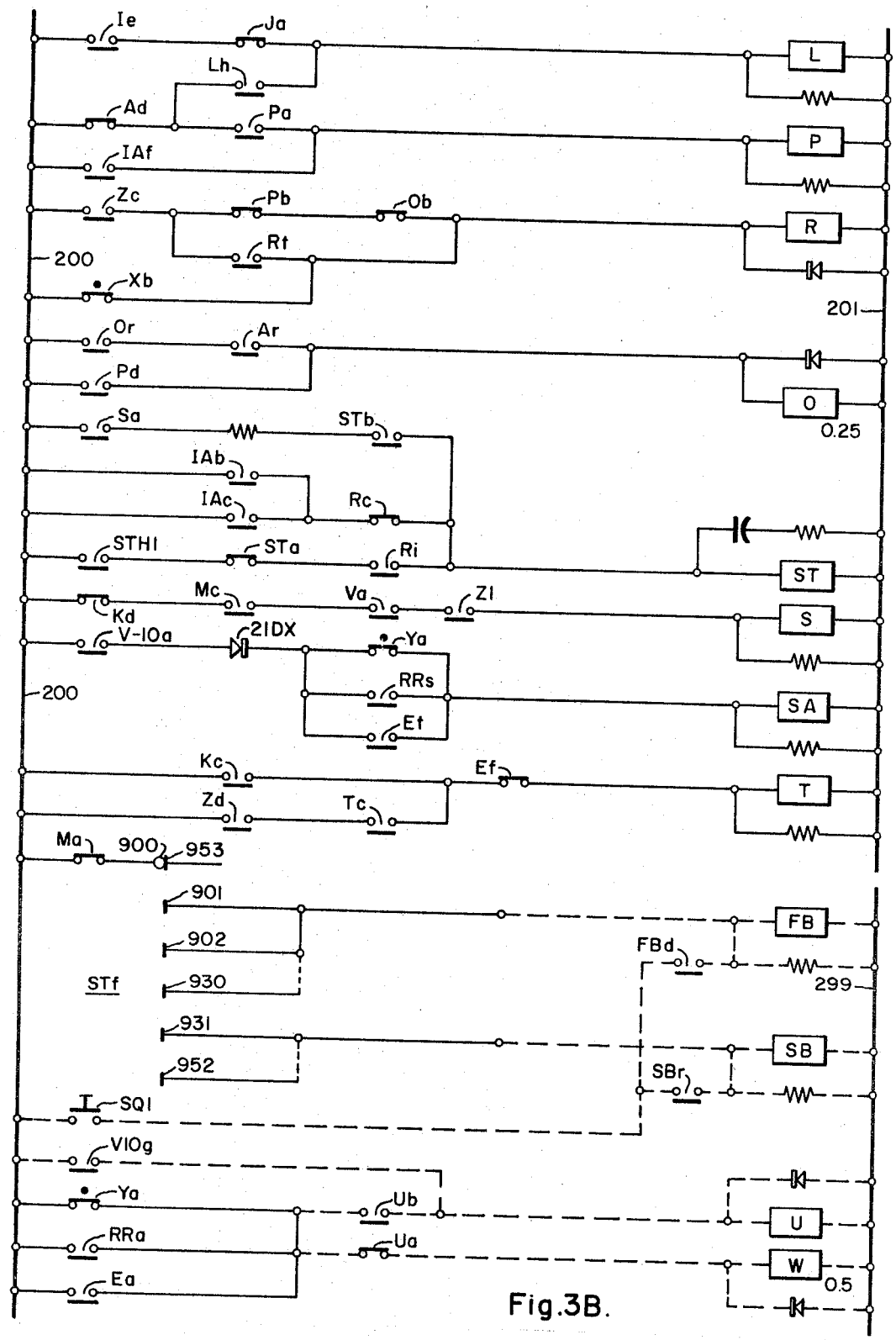
Figure 3C:
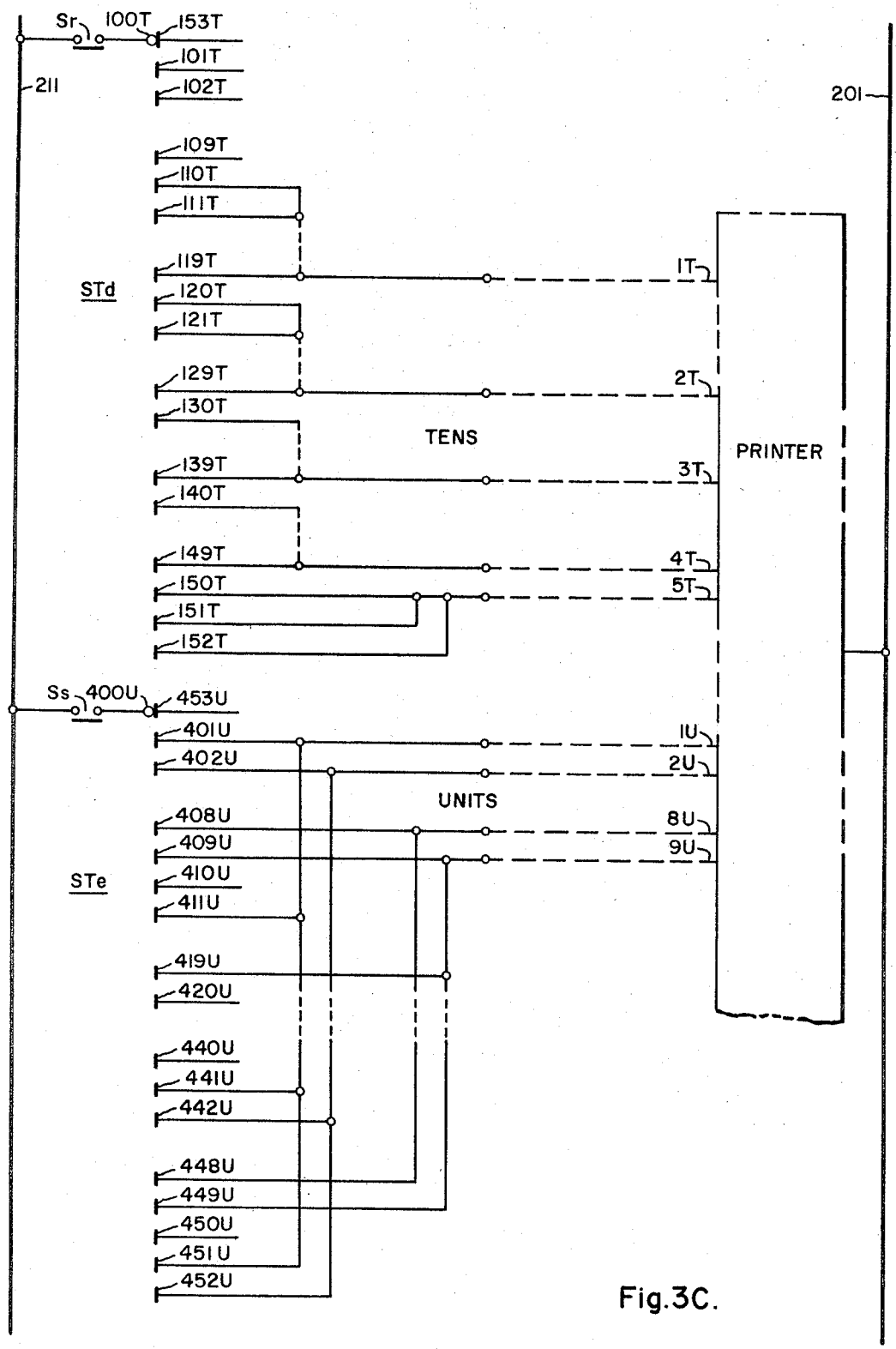
Figure 3D:
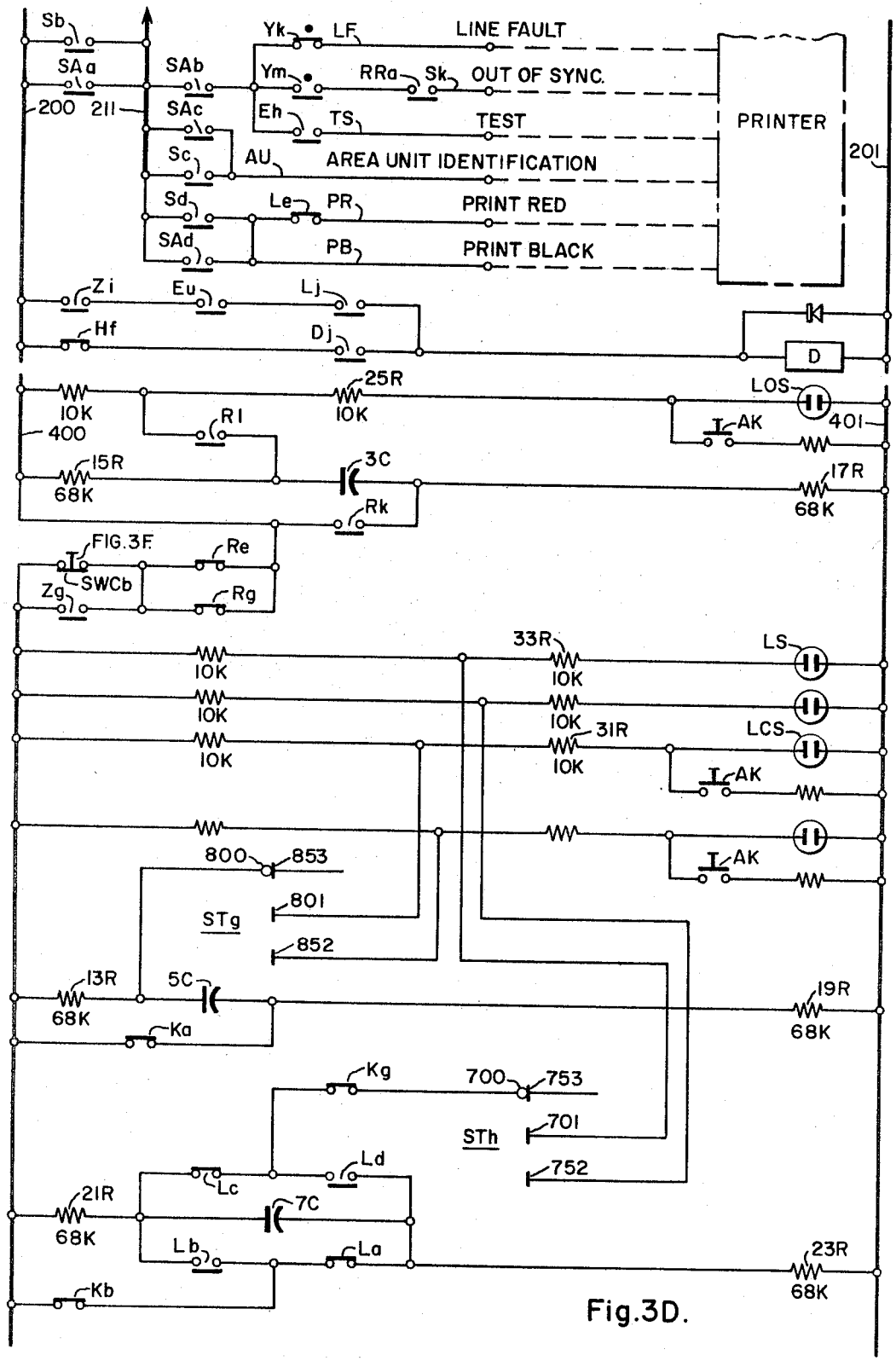
Figure 3E:
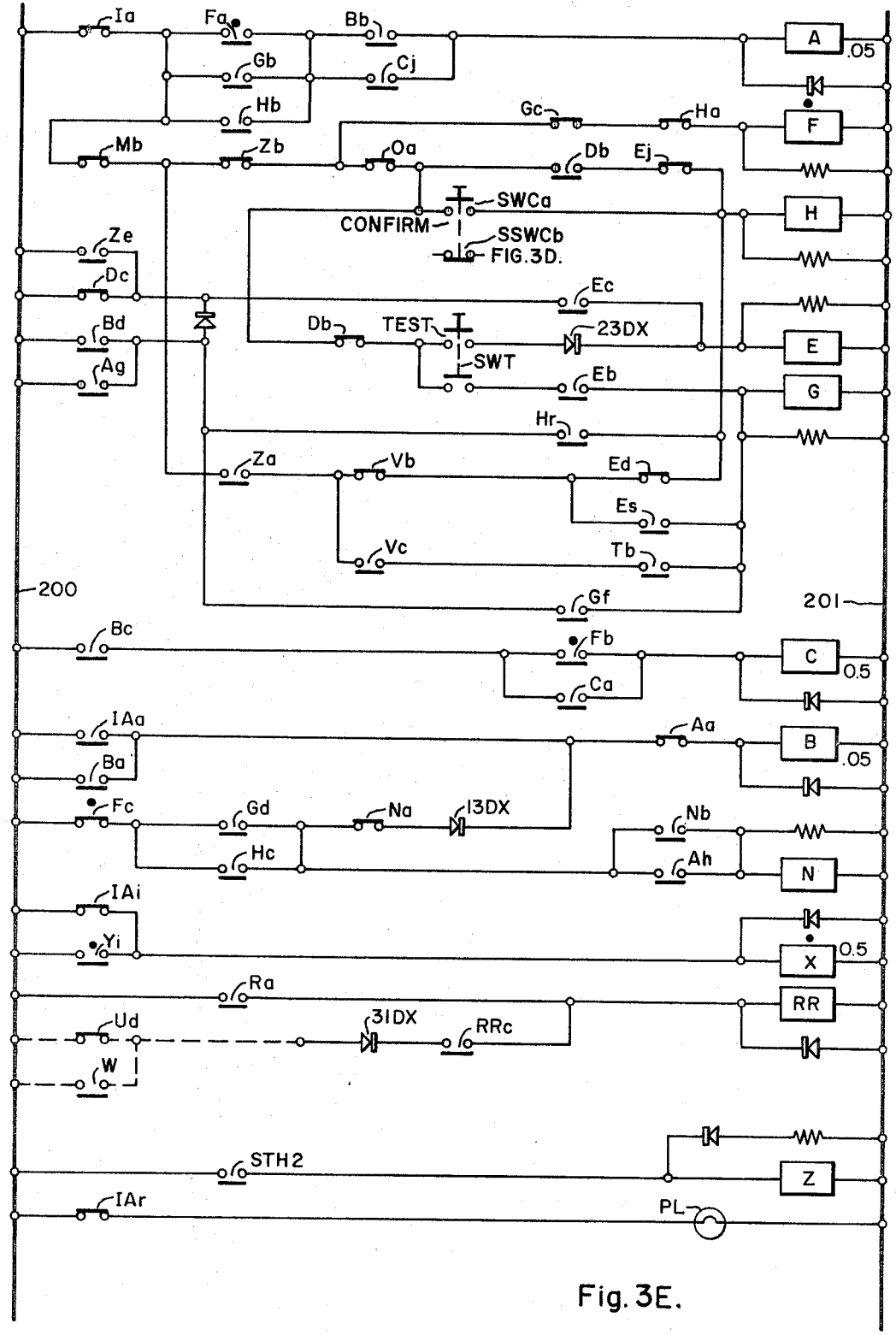
Figure 3F:
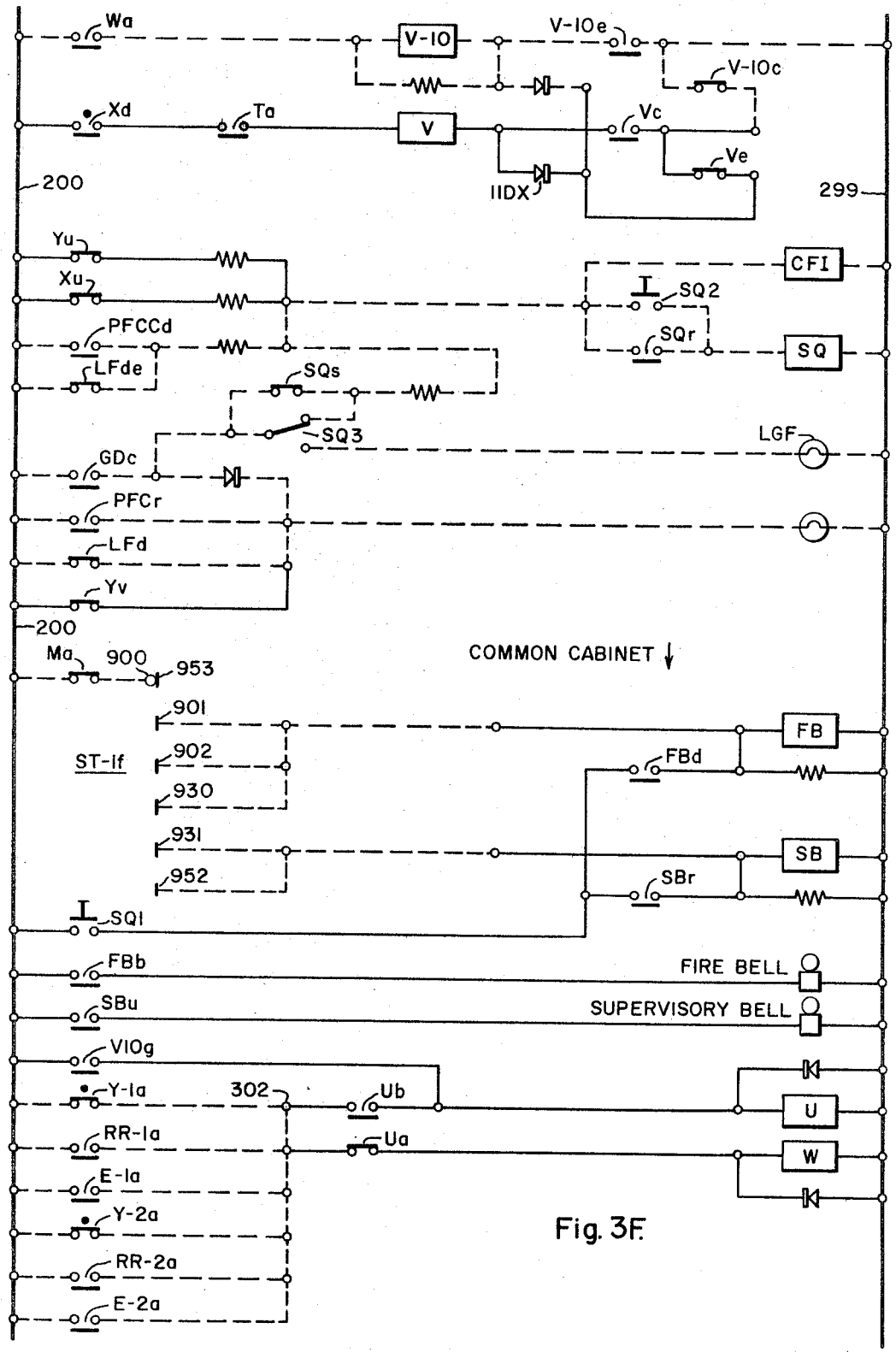
Figures 3G, 4:
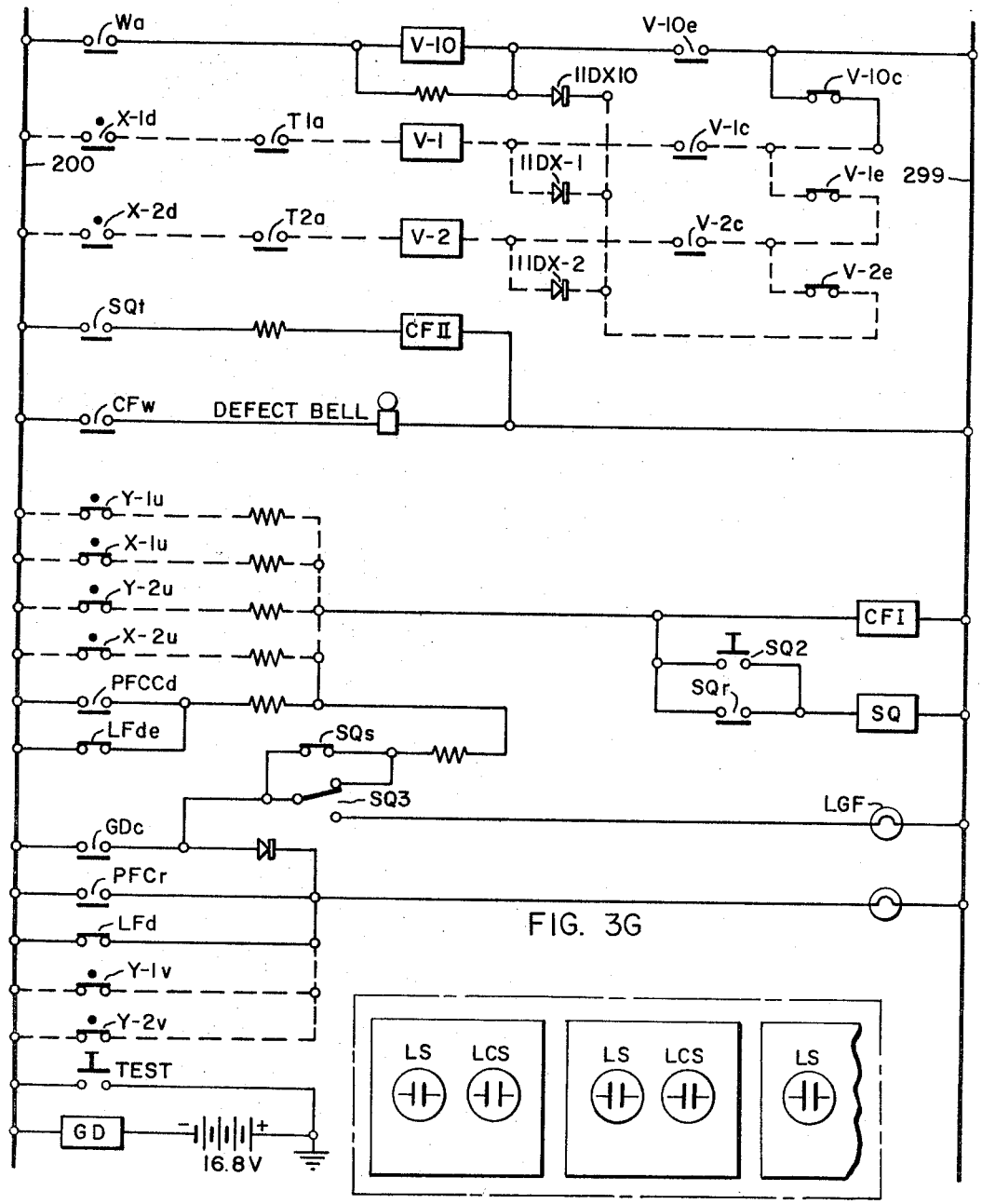
FIG. 4 is a fragmental diagram showing an indicator according to this invention.

The pertinent portions of the CONSOLE UNIT are shown in FIGS. 3A–3G. In these figures, one complete console is shown. The relays of this console are identified by letters such as A, B. Also the common cabinet and its associated relays and contacts is shown. These relays are identified by letters such as D, U, W, V–10. Some common cabinet relays are shown in the part of the figures showing the one console. The connections of these common relays are shown in broken lines. Relays from the separate consoles are also shown in the common circuit (FIGS. 3F and 3G). These relays for different consoles are identified by a number. Thus relay V for console 1 is identified V–1, for console 2, V–2, etc. The connections for these latter relays in the printer cabinet are shown in broken lines. In the interest of concreteness it is assumed that there are two consoles and a common cabinet.

The following relays at the CONSOLE UNIT are individual to each console: A, B, C, D, E, F, G, H, I, IA, J, K, L, M, N, O, P, R, RR, S, SA, T, V, X, Y, YA, and Z. Relays CF, FB, GD, SB, SQ, U, W, and V–10 and LF and PFCC are common to all consoles.

The functions of the various relays are presented in the following table:

Relay:           Function

A _____ Normally deenergized—Energized and deenergized to cause a signal pulse to flow through the communication channel CA1 and CA2. This pulse depending on whether it is of low magnitude or zero causes relay 4 or relays 3 and 4 to dropout and to produce an indication of an occurrence at the console.

B _____ Normally deenergized—Cooperates with A to transmit a pulse of duration 100 milliseconds through channel CA1–CA2.

C _____ Normally deenergized—Cooperates with B and A to transmit a pulse of about 500 milliseconds through channel CA1–CA2. This pulse indicates that step-switch ST at the console is at home.

D _____ Normally deenergized—Cooperates in carrying out the sequence of relay operations following a Test command.

E _____ Normally deenergized—Initiates the test function on Test command.

F _____ Normally energized—When deenergized initiates the timing of the pulse which produces a 500 millisecond signal to indicate that the step-switch ST has returned to the home position.

G _____ Normally deenergized—Actuated following the printing of intelligence to indicate that the printing has been completed and that the operation of the area panel may now proceed. Also advances the test sequence on Test command when energized following the actuation of E. Actuation of this relay causes the pulse transmitted over channel CA1–CA2 to have a reduced, and not zero, magnitude so that only relay 4 is actuated at the area panel.

H _____ Normally deenergized—Energized to initiate the Confirm operation on the Confirm command. This relay is also actuated in the eventuality that the intelligence of an alarm or restoration is not printed.

I _____ Normally deenergized—Communication relay responds to pulses from area panel along channel CA1–CA2. This relay is actuated on a pulse from the area panel in which the current flowing along CA1 and CA2 is substantially reduced (16 unactuated) or if the pulse is of zero current (16 actuated).

IA _____ Normally deenergized—Operates responsive to actuation of relay I to step the step-switch and to advance the sequence of the relay operation. Also actuates the signaling relays sequence A–B.

J _____ Normally energized—Deenergized when current through CA1 and CA2 is reduced to zero. This happens when relays 1 and 16 at the area panel are energized. This relay operates to distinguish between intelligence as to an alarm (it remains actuated) and intelligence that an area has been restored from alarm to normal (drops out).

K _____ Normally deenergized—Energized on energization of I and IA when pulses are received from area panel. Introduces a hold between pulses received from area panel which energize and deenergize IA. K having a delay of 100 milliseconds remains actuated.

L _____ Normally deenergized—Energized on receipt of intelligence of restoration to normal when I is actuated and J is deenergized. Controls the color of the printed record and the indicator lamps.

M _____ Normally deenergized—Energized during the receipt of pulses from area panel times out 100 milliseconds after K times out—times duration of the printing.

N _____ Normally deenergized—Energized at start of Confirm or Test. Assures that only one pulse is transmitted on the occurrence of either of above events.

O _____ Normally deenergized—Operates to time out and measure the interval from the time the console has transmitted intelligence to the area panel to the time of the response by the area panel when the console is away from the home position. If step-switch SS at the area panel is away from the home position, the response occurs within 100 milliseconds and O does not time out. If the step-switch SS at area panel is at home position; that is, the two step-switches SS and ST are out of synchronism, O is deenergized and times out in 250 milliseconds because relay 7 at the area panel prevents the response for 500 milliseconds, R operates and step-switch ST resets through R.

P _____ Normally deenergized—Energized through IAf. This relay causes O to time out when it becomes deenergized on the transmission of intelligence to the area panel if answer does not come back from the area panel. This occurs when the step-switches SS arrive at the home position ahead of ST.

R _____ Normally deenergized—Resets step-switch ST when step-switch ST is out of synchronism with SS.

RR _____ Normally deenergized—Energized to serve as memory of out of synchronism—actuates printer when printer is available.

S _____ Normally deenergized—Controls printing of alarms on energization of V and M.

SA _____ Normally deenergized—Controls printing of tests and related information.

T _____ Normally deenergized—Is actuated to actuate V and thus to actuate S so that if printer is available it conditions the printer to print.

V _____ Normally deenergized—When the printer is required, relay V seizes the printer as soon as it becomes available providing a higher priority unit is not seeking the printer at this time.

X _____ Normally energized—Becomes deenergized when there is a fault on the channel CA1–CA2 and I is actuated, IA energized and Y deenergized.

Y _____ Normally energized—Operates in the event of open-circuit of CA1 or CA2 or short between these lines. This relay sets the communication channel to operate between ground and the intact wire CA1 or CA2 or both when shorted.

| Relay: | Function |
|---|---|
| YA | Normally energized—Deenergized when fault occurs and IA is energized. |
| Z | Normally deenergized—Energized when step-switch ST is away from home position. |
| ST | ST step-switch—Normally deenergized—controls banks of contacts STg and STh for signal lamps, banks STd and STe for printing, and bank STf for bells and buzzers. |
| PFCC | Normally deenergized—Becomes energized when battery supplies power to load. |
| LF | Normally energized—Becomes deenergized on lamp power supply insufficient voltage condition. |
| CF | Normally deenergized—Becomes energized on console electrical fault. Energization of CF energizes the lamp and rings bell to indicate power failure. CF can monitor two independent faults by operation of squelch. |
| FB | Normally deenergized—Energized to sound critical alarm bell. |
| GD | Normally deenergized—Detects grounding of supply conductor 200 or 201 or any point having an electrical circuit to 200 201 similar to relay 12 of area panel. |
| SB | Normally deenergized—Energized to sound buzzer for supervisory alarm. |
| SQ | Normally deenergized — Energized to squelch sound of console failure buzzer. CF is conditioned to respond to a second electrical failure. |
| U | Normally deenergized—Takes over printer for common usage (highest priority) on actuation of V–10. Cooperates with W to limit printer seizure time to 0.5 seconds. |
| W | Normally deenergized—Times out when printer is taken over by U for common use. |
| V–10 | Normally deenergized—Energized to take over printer for common use. Also operates to print intelligence of out of sync operation, line fault or test for each individual console. |

The step-switch ST has home contacts STH1 and STH2 which are open when the switch is in the home position and are closed in all positions away from the home position. This switch also has contact STa, a normally closed contact, which opens repeatedly when continuous current is transmitted in series with the coil of the step-switch ST. Thus if step-switch ST is away from the home position and is to be reset due to being out of sync with the area panel step-switch SS, it is supplied with continuous current causing it to be repeatedly moved until it reaches the home position. The step-switch ST also has a make contact STb connected in series with a contact Sa of relay S, which latter controls the printer. On supply of current to the coil of ST, STb closes. If Sa is then also closed stepping of ST is prevented. The operation of ST is thus prevented while the printer is in operation.

The step-switch ST operates a number of banks STf, STg, STh, STd, STe. The printer is controlled through the STd and STe banks. STe causes the printing of units numbers and the STd causes the printing of tens numbers. The wiper of the STd bank passes from home 153T through 109T while the STe bank passes from home 453U to 409U. On the next operation of the step-switch ST the wiper of the STd switch passes to contact 110T while the wiper of the STe switch is disconnected. During the next nine operations the wiper of the STd switch remains connected to the contacts 110T through 119T while the STe switch moves from 411U through 419U. This operation continues so that two digit numbers can be printed. The STf bank controls the critical alarm bell and the supervisory buzzer. The STh bank controls the detector-state lamps LS; the STg bank, the detector-changed-state lamps LCS.

There are in the console three switches SQ1, SQ2 and SQ3 the purpose of which is to turn off buzzers and to perform related functions. SQ1 is connected in the lock-in circuits of relays FB and SB which turn on the fire or critical-alarm bell and the supervisory bell respectively. The actuation of SQ1 opens these circuits and stops the bell.

SQ2 controls CF. CF is energized on the occurrence of any undesired condition either in the power supply or in the wiring for example by the reclosing of a Y relay or an X relay or by the actuation of relay PFCC or the dropping out of relay LF. CFI is supplied with current actuating this relay and operating the defect buzzer. To turn off this buzzer the operator closes SQ2, this energizes relay SQ which supplies ampere turns through CFII causing CF to drop out.

If another defect occurs a second relay of the group X1, X2, Y1, Y2, GD, PFCC, or LF will operate. An additional current flows through CFI again picking up relay CF. If there is a grounding, contact GDc closes. GD also causes additional current to flow through CFI so that CF operates. At this point the operator may operate SQ3 opening the additional circuit through CFI and also closing the circuit through ground failure hold lamp LGF. This indicates that there is a ground failure and reverts the relay CF to the condition in which CFI and CFII carry opposing ampere turns so that CF again drops out stopping the defect buzzer.

Relay V–10 is a priority relay the priority of which is assured by the contact structure of this relay. The make contact V–10e is in the lock-in circuit of V–10 this contact makes before the break contact V–10c can break. If any other relay such as V–1 or V–2 in the energizing circuit of the coil of V–10 is operated, it may tend to operate but the contact V–10e closes before the relays V–1 or V–2 can operate and V–10 takes over. When V–10 takes over to print TEST, for example, the record of the test 5A is actuated through V–10a (FIG. 3B) and (FIG. 3D) which includes the word "test" the date and time and the area panel and console, for which the test has been made, are printed in the circuit 200, SAa, SAb, Eh, printer.

A plurality of consoles may be supplied in common with power. The power may be derived from the commercial 120 volt alternating-current supply. The supply conductors 200 and 299 are energized from the commercial lines through a transformer-rectifier unit TR1. The transformer is preferably of the regulator (SOLA) type so that the voltage is reasonably regulated. The voltage supplied between conductors 200 and 299 is 48 volts. The conductor 299 is connected to the negative terminal of the transformer-rectifier unit TR1 through a diode 5DX. With the power at the alternating current commercial terminals available, current flows from the positive terminal of the transformer-rectifier unit TR1 through conductor 200, the load, diode 5DX to the negative terminal.

An additional supply for energizing the light signals is also provided. This supply is energized from the single-phase commercial lines through transformer T6 and rectifier 5RX (FIG. 3A). This supply energizes conductors 400 and 401 (FIG. 3D). Conductor 400 is connected to conductor 200. Conductor 401 is connected to 5RX through rectifier 9DX. Across the supply the coil of relay LF is connected through two neon lamps NE1 and NE2 in series. One lamp has a resistor 7R in parallel to increase the probability of both neons firing. This relay is normally energized and becomes deenergized on failure of the supply, to supply sufficient voltage to operate the lamps.

For the eventuality that the main power supply fails batteries B8 and B9 are provided. Battery B8 is an 84 volt battery and battery B9 delivers approximately 48 volts. Battery B9 is charged from a supply which is also connected to the commercial alternating current single-phase conductors and supplies the charging current through a rectifier 7RX and a resistor 309R. Battery B8 is charged from the lamp power supply through diode 7DX and resistor 9R. The positive terminal of battery B8 is connected to the negative terminal battery B9 so that approximately 140 volts is available between the positive terminal of B9 and the negative terminal of B8. The negative terminal of B8 is adapted to be connected to conductor 401 through contact LFc when relay LF is deenergized. When relay LF is energized the negative terminal of battery B8 is connected through a resistor 9R and a diode 7DX to 401 to maintain B8 charged. Conductor 401 is connected through diode 9DX to the negative pole of rectifier 5RX. Battery B9 is shunted by a regulating Zener diode Z10 which breaks down when the voltage reaches 52 volts. The negative terminal of battery B9 is adapted to be connected to conductor 299 on the failure of the commercial power supply, through Zener diode Z20, the coil of relay PFCC and rectifier 91DX. PFCC is actuated when the commercial power supply voltage drops below 41 volts and causes the diode to be shunted by PFCCa so that power is supplied from the battery between conductors 200 and 299 through PFCCa. In the event of power failure power is also supplied for the lamps from the batteries B8 and B9 through conductors 400 and 401, conductor 400 being common with conductor 200. Diodes 91DX and 5DX serve to isolate the rectifier power supplies in the event of short circuits in either of them. Power is always available to the load during transition.

The relays I and J are connected to be supplied through the channel CA1–CA2. Under normal circumstances current flows through the coil of J and the coil I II in the circuit from conductor 200 through resistor RA, Yb and Yc, CA2, 13b, and 13c, 3, 4, 1d and 1e, CA1, J, I, II, Ab and Ac to 201. Current also flows through I I from 200 through resistor 11R, I I, Ab and Ac to 201. Resistor RA is set so that it compensates for any substantial difference between the resistance in the circuits of I I and I II. The setting is such that the amperes currents through I I and I II conterbalance each other and relay I is normally unactuated; J is energized and actuated.

The low-current and zero-current pulses produced at the area panel by repeated operation of relay 1 are transmitted through the coils J and I II. The low-current pulses reduced the ampere-turns through I II causing I to be actuated but J remains actuated. The zero-current pulses cause I to be actuated and J to drop-out.

Energization and subsequent deenergization of A with G actuated produces a low-current pulse which flows to the area panel through CA1 and CA2; with G deenergized a zero-current pulse flows. Since the contacts Ac and Ab and Ga are in series with both I I and I II, I remains unactuated both for the low-current-pulse and for the zero pulse. J drops out for the zero pulse but this has no effect since there is a front I contact in series with each J contact; for example; Ie and Ja.

*Alternative communication link*

When CA1 or CA2 is open-circuited or CA1 and CA2 are short-circuited the communication link operates through ground and RB and the intact conductor or conductors. The open circuiting or short-circuiting interrupts the power from 200 and 201 along the communication link and relays 3 and 4 at the area panel are deenergized. Relay I at the console is actuated either because coil I II is deenergized or because coil I II is energized to a level sufficiently greater than coil I I. Relay J at the console may be deenergized. Relays 4A, I and IA are then energized. Relay 13A is deenergized by 4Aj, relay 13 by 13Aa, relay YA by IAk and relay Y by YAb, providing the open or short exceeds 500 milliseconds.

The following ground circuit is now established; at the console, 200, RA, Yr, RB, ground; at the area panel, ground, 13d, 3, 4, 1d and 1e, CA1 or CA2 or both depending on defect, at the console, Yd (if CA1 opens), J, I II, Ab and Ac, 201. The apparatus is thus in operation through the auxiliary ground circuit.

Resistor RB is set so as to have a magnitude to compensate for the line resistance when CA1 or CA2 is open circuited or CA1 and CA2 are shorted. As a compromise resistor RB is usually preset to 62.5% of the total line resistance of CA1 and CA2. Assuming that CA1 and CA2 each has a total line resistance of 250 ohms, the setting of RB at 62.5% of the total line resistance would result in substantial compensation for the line resistance in various conditions of CA1 and CA2. Thus, with CA1 and CA2 intact, and the communication link in the normal condition, RB would not be connected in the circuit so that the line resistance would be 500 ohms and any error would be zero. With either CA1 or CA2 in the circuit alone, the line resistance is 250 ohms assuming ground resistance to be about zero ohms. RB is 62.5% of 500 ohms or 312 ohms so that the total resistance is 562 ohms and the error is 62 ohms in 1270 ohms which is about 5%. The resistance between 200 and 201 for the circuit containing the coil I I is 1270 ohms. Assuming that CA1 and CA2 are shorted, the line resistance is 125 ohms, RB being 312 ohms the total resistance is 437 ohms and the error is 63 ohms. The resistance RA is set so that equal currents flow in coils I I and I and II in normal state.

The V relays for the various consoles are connected to prevent operation of other V relays when the V relay of one console is operated. The relay V–10 takes precedence over any of the V relays of the other consoles. Thus, when V–10 is actuated contact V–10c (FIG. 3G) is opened preventing power flow to any V relay. With V–1 actuated V–1e is opened and the flow of power to any other relay V–10, V–2 and the others, is prevented.

When power is first applied to the conductors 100, 101 and 105 at the area panel and 200, 299 and 201 and 400 and 401 at the consoles, they are energized. Coil I I at the console is energized in circuit 200, 11R, I I, Aa and Ac, 201. Relays Y and 13 are deenergized and the communication link including the conductors CA1 and CA2 is connected to the relays 3 and 4 and I and J through ground in the following circuit: at the console, 200, RA, Yr, RB, ground; at the area panel, ground, 13d, 3, 4, 1d and 1e, CA1 and CA2, and at the console J, I II, Ab and Ac, 201. Since the ampere-turns through I I and I II counteract relay I does not operate. Relay J is actuated. Relays 3 and 4 at the area panel are also energized. Since I is deenergized IA is also deenergized and X is energized through IAi.

With power between the conductors 400 and 401, (FIG. 3D) capacitor 3C which controls the firing of the out-of-sync lamp LOS at the console is charged in circuit 400, resistor 15R, capacitor 3C, resistor 17R, 401. The capacitor 5C which controls the detector-changed-state lamps LCS is, conditioned to be charged when on receipt of intelligence of an alarm by the console, K is energized and Ka is opened. This charging is as follows: 400, contact Re and Rg, contact Zg, or confirm-switch closed contact SWCb, resistor 13R, capacitor 5C, resistor 19R, 401. The capacitor 7C which controls the detector-state lamps LS is likewise conditioned to be charged when Kb is opened. This charging circuit is as follows: 400, Re and Rg, SWCb, 21R, 7C, 23R, 401.

There is a bank of lamps LS and LCS which are connected to the contacts of banks STg and STh each lamp LS, a detector-state lamp and LCS, a detector-change-of-state lamp corresponding to an area protected and each contact of the bank similarly corresponding to such area. As shown in FIG. 4 the lamps LS and LCS are mounted in modules side by side.

The serviceman at the area panel cooperates with the attendant at the console to set the system into operation. The timing of this operation may be arranged by phone communication or using the system to signal. By prearrangement, the attendant at the console is to close the main reset button MR when the console shows the out-of-sync light LOS. The serviceman at the area panel then closes the armature of relay 13A energizing relay 13 through contact 13Aa. He must maintain 13Aa closed for a few seconds. Contact 13d is now opened and the ground circuit through which the coils 3 and 4, I II and J were energized is opened. Relays 3, 4 and J become deenergized and since coil I I still remains energized, relay I is actuated. Relay IA is then energized through Ib opening IAi and deenergizing relay X which drops out after 500 milliseconds. Relay R is then energized through Xb. Before R became energized, IAb, IAc closed and the coil of the step-switch ST was supplied with current so that the spring of the step-switch was cocked for operation. When R is energized, Rc is opened and ST is advanced one step. Since R is energized, Ri is also closed. The step-switch is now caused to advance by the repeated opening and closing of STa.

While switch ST is operating, the lamp LOS indicating out-of-sync operation is energized. This lamp is fired in circuit (FIG. 3D) 400, Rk, 3C, R1, 25R, LOS 401. This effectively doubles the lamp voltage applied to LOS. Lamp LOS is now energized.

As prearranged, the attendant at the console now closes the "Main Reset" MR. YA is energized and Y is energized through YAb. Conductor CA1 and CA2 are now connected to operate in normal manner. Relay I is now deenergized and J energized. Relay ST continues to operate through its steps until it reaches the home position when STH1 is opened opening the circuit through STH1, STa and Ri; ST then stops at the home position.

Relays 3 and 4 are now energized and I is dropped out and J is energized. IA is now deenergized and YA remains locked in through IAk and YAb. The main reset MR may now be released. X is re-energized through Yi and IAi. With step-switch ST in the home position, Z is de-energized and F is energized in circuit 200, Ia, Mb, Zb, Gc, Ha, F, 201. Since X is energized and the step-switch ST is in the home position, Xb is open and Zc is open and R is deenergized.

At the area panel when power is first applied 22 is deenergized. Relay 1 is then energized through 2a and 22e. Relay 2 is energized, relay 1 drops out after 50 milliseconds and the step-switch SS is stepped. With SS away from home relay 21 is energized through SSH. Relay 9 is energized and when the communication link is established is locked in through 4Ad and 9b. Relay 6 is energized through 9a. Relay 22 is energized through 21e. 22e opens but 1 and 2 continue to be operated through 21a. With 22 actuated relay 14 is actuated through 22b and 2c when 2 is deenergized. 14 remains actuated in spite of the repeated opening and closing of 2c because 14 can only drop-out if deenergized for 2 seconds.

When the step-switch SS returns to home, 21 is deenergized and 21c closed. 10 then is energized in circuit 100, 21c, 4A1, 9c, 8b, 10, 101. With 10 energized relay 8 is energized through 10b and 14d and is locked in through 21g and 8d and also through 4Ag and 8d. This causes a Confirm cycle. The communication link is set to the normal mode as explained on page 49.

The serviceman at the area panel also presses the armatures of each of the relays 20–1 through 20–30. This opens contact 20–1a through 20–30a and 20–1b through 20–30b. The relays labeled 20– are then actuated and their contacts are opened. Also the contacts 20–1c through 20–30b. The relays labeled 20– are then actuated detector and that circuit is restored to normal. The coils I and II of critical alarm relays 18–1 through 18–30 are then supplied in series through the corresponding 20– relays. There are no contacts in the critical alarm circuits other than the contacts DE.

In the stand-by condition of the apparatus, the current flowing along conductors CA1 and CA2 is continuous. The signaling between CA1 and CA2 is effected by reducing the current either to a low magnitude or to zero depending upon the signal to be transmitted for predetermined intervals of the order of 50 to 500 milliseconds. The significance of the various signals and their properties and the relays which take part in the signaling in a typical system are presented in the following table.

COMMUNICATIONS BETWEEN ENCODER AND DECODER

| Signal, Significance | Originating Point | Transmitting and Key Relays | Line Current in milliamps. | Pulse Width in millisecs. | Receiving and Key Relays |
|---|---|---|---|---|---|
| Standby | | | 38 | (¹) | |
| Alarm | Area Panel | 1 actuated | 5.5 | 50 | I actuated. |
| Restoration | do | 1 and 16 actuated | 0 | 50 | I actuated, J drop-out. |
| Cannot Transmit | do | 14 drop-out | 62 | (¹) | I actuated, X and Y drop-out. |
| Continue, you were printed | Console | A and G actuated | 5.5 | 100 | 4 drop-out. |
| Continue, you were not printed | do | A and H actuated | 0 | 100 | 3 and 4 drop-out. |
| At Home | do | A, F, and C actuated | 0 | 500 | 3 and 4 and 8 drop-out or 3 and 4 and 9 drop-out. |
| Test | do | A and G actuated | 5.5 | 100 | 4 drop-out, 11 actuated. |
| Confirm | do | A and H actuated | 0 | 100 | 3 and 4 drop-out, 10 actuated. |

¹ Continuous.

*Operation*

*Critical alarm.*—In explaining the operation, it may be assumed that an alarm has occurred in area 1 so that contact DE in parallel with 18–1 I has closed. Relay 18 is now actuated and locked in in circuit 100, 23, 19–1a, 18–1a, resistor 27R, 18–1 II, 101.

Relay 23 is actuated and 23b opens in the lock-in circuit for relay 22. Relay 22 starts to time out. But if the step-switch SS is stepped properly relay 22 is re-energized by 21e and no change occurs in its actual operation.

In addition, 18–1d is closed and a circuit is closed through 100, 18–1d, 19–1c, diode 3DX, 2a, 1, 101. Relay 1 is then actuated. This in turn closes 1a energizing 2 and deenergizing 1 and step-switch SS starts an operation. When SS moves away from the home position relay 21 is actuated.

When relay 1 is energized contacts 1d and 1e open reducing the current in CA1 and CA2 for the time interval during which relay 1 is energized. A pulse of reduced current thus flows through CA1 and CA2. This reduces the current through the circuit including the coils of relay J and I, II at the console. Relay J is unaffected since the current is not reduced to zero but relay I is actuated.

Relay K is energized through contact I*b* and diode 203DX and relay IA is energized through contact I*b*. Relay K is held through IA*d*. Actuation of relay K opens K*a* and K*b* and capacitors 5C and 7C charge.

When relay K is deenergized it drops out in about 100 milliseconds. The lower current pulses which operate relay I may have a duration of 50 milliseconds. Thus relay K remains actuated while the pulsing is proceeding. At contact K*e* relay M is also actuated. This relay also drops out 100 milliseconds after it is deenergized, and it also remains energized during the pulsing.

When relay IA is energized IA*b* and IA*c* are closed, energizing coil ST. At the end of the pulse I drops out, IA then drops out and ST advances one step. STH2 closes energizing Z.

At the area panel the energization of relay 1 causes 1*a* to close and relay 2 becomes energized, contact 2*a* is then opened and relay 1 is deenergized. The step-switch SS has at this point advanced one step and the wiper 600 on bank SS*b* to 601. At 601 the following circuit is closed 100, 18–1*d*, 19–1*c*, contact 601 of SS, 41DX, 5*a*, 8*a*, coil 2, 101. Relay 2 is then locked into energized condition preventing further actuation of relay 1 and advance of the step-switch SS.

Relay T is actuated in circuit 200, K*c*, E*f*, T, 201 and locked in through Z*d* and T*c*. Since X is actuated the following circuit is then closed through the coil of V (FIG. 3F): 200, X*d*, T*a*, V, diode 11DX, V2*e*, etc. through V–10*c*, 299. The V-contacts are assumed to be all closed and this signifies that the printer is at this point available. If the printer is being used by another console one of the V-contacts is open and the circuit through V is not closed at that time.

When the operation of step-switch SS stops, the current through conductors CA1 and CA2 becomes continuous and relay I drops out, relay IA then drops out and K drops out after 100 milliseconds. Thereafter M drops out after another 100 milliseconds.

At the console the step-switch ST is in the first position so that banks ST*g* and ST*h* are at 801 and 701 respectively (FIG. 3D). With K deenergized the following circuit is closed, 400, R*e* in parallel with R*g*, Z*g*, K*a*, 5C, 800, 801, resistor 31R, lamp LCS, 401. The capacitor 5C causes lamp LCS to be subjected to 280 volts peak and this lamp is energized indicating that the detector in the area 1 has changed state. In addition the capacitor 7C is discharged in the following circuit 400, R*e* and R*g*, Z*g*, K*b*, L*a*, 7C, L*c*, K*g*, 700, 701, resistor 33R, lamp LS, 401. Lamp LS is energized indicating an alarm. During the interval between the drop-out of K and the drop-out of M, relay S is energized in circuit 200, K*d*, M*c*, V*a*, Z*l*, S, 201. Energization of relay S causes S*b*, S*c*, S*d*, S*r* and S*s* to close and the printer operates. Banks ST*d* and ST*e* are at 101T and 401U. ST has stopped at the first position so that the alarm area number printed is 1, the date and the time. Since relay L is at this time deenergized, this information is printed in red by operation of the contact S*d*.

When relay M drops out, a circuit is closed from 200; through M*a*, 901 of the step-switch, FB, and 299. Contact FB*b* then closes energizing the critical alarm bell. FB is locked in through FB*d* and the lock-in circuit may be opened by the "Squelch" push button SQ1 when the step-switch ST starts returning to home position.

Relay V is locked in through V*c*. Contact V*e* is open and this for the time being prevents the printer from being taken over by any other console. Relay T is locked in in circuit 200, Z*d*, T*c*, E*f*, T, 201.

When M drops out M*b* is closed and relay G is energized in circuit 200, I*a*, M*b*, Z*a*, V*c*, T*b*, G, 201. Relay G is locked in as long as B or A is actuated in circuit 200, B*d* or A*g*, G*f*, coil G, 201. G*a* is then closed. When the console was receiving the pulse from the area panel, IA operated and caused B to be energized through 200, IA*a*, A*a*, B, and 201. B then locked in through B*a*. Since B*b* is also closed the following circuit is closed through A; 200, I*a*, G*b*, B*b*, A, 201. A is then energized and A*a* opens. This deenergizes B and when B times out after 50 milliseconds B*b* opens and A times out after 50 milliseconds. The pulse produced by A and B in this way has a duration of about 100 milliseconds.

When A is actuated for its duration of approximately 100 milliseconds A*b* and A*c* are opened, and G*a* being closed, a pulse of reduced magnitude is transmitted through the conductors CA1 and CA2.

By the closing of contact G*b* relay N is energized when A is energized in the following circuit: 200, F*c*, G*d*, A*h*, N, 201. N is locked in through N*b* and opens N*a* so that only one pulse may be transmitted by the cooperation of relays A and B.

The significance of the pulse which is transmitted on the actuation of G is that the area panel may now continue and that the report has been printed. At the area panel the current flow through relays 3 and 4 is reduced to a lower magnitude for the duration of the pulse from the console and relay 4 is deenergized and drops out. 4A is then energized in circuit 100, 1*f*, 4*h*, 4A, 101. Bank SS*c* of step-switch SS was stopped at 501, and, when relay 4A is actuated relay 19–1 is energized and actuated in circuit (FIG. 2D) 100, 4A*a*, 3A*k*, 500, 501, 18–1*g*, 19–1 II, 101. 19–1*g* and 19–1*h* are closed but 19–1 I is short-circuited at 18–1*g* and relay 19 remains actuated. The circuit through 19–1 II is locked in through circuit 100, 11*b*, 10*a*, 19–1*h*, resistor 311R, 19–1 II, 101.

In addition when 4A is energized 4A*b* is closed and 5 is energized and locked in through 1*g* and 5*b*. 5*a* opens in the circuit of relay 2 but relay 2 remains locked in through 4A*c*, 8*a*. At the end of the pulse when 4 becomes energized and 4A drops out 2 becomes deenergized. 2*a* now closes and the alternate energizations of relay 1 and relay 2 as now described above now starts again and switch SS is advanced step-by-step. On the first energization of relay 1 contact 1*g* opens deenergizing relay 5 and resetting it so that as the step-switch SS is advancing new alarm signals may be processed.

Step switch ST at the console is advanced step-by-step with SS towards the home position. If there are any alarm signals between the position 1 and the home position these would be picked up by the advancing switch. Let it be assumed that there are no such alarm signals. The step-switches SS and ST then continue to advance until they reach the home position.

When the step-switches SS and ST reach the home position relay 21 at the area panel is deenergized and drops out. 2 is then energized and locked in through 21*b* and 7*a* and the advance of the step-switch SS stops at the home position. The advance of the step-switch ST stops at the console since it receives no additional advance pulses.

While step-switch ST was being stepped at the console relays I and IA were operating and relay K remained energized. When the step-switch SS at the area panel reaches the home position the pulsing of I and IA stops, K times out and drops out and M times out and drops out. When M drops out M*b* closes and since at this point Z*b* is also closed because the step-switch ST is in the home position relay F is reenergized. Neither G nor H may operate at this time since O*a* is open. In the home position Z is deenergized and Z*a* drops out.

During the switching of step-switch ST, relay IA is energized. Relay B is then also energized and locked in through B*a* and contact B*c* was closed. When ST reaches the home position and F becomes energized, C is energized through contact F*b* and locked in through B*c* and C*a*. In addition, relay A is energized through F*a* and B*b* and locked in through I*a*, F*a*, and C*j*. IA*a* opens deenergizing relay B which times out in 50 milliseconds. When B times out C is deenergized and times out in 500 milliseconds. Relay A remains energized until relay C drops out C*j* that is for approximately 500 milliseconds.

During this time A*b* and A*c* are open and since G*a* is also open a pulse of 500 milliseconds and zero magnitude is transmitted along conductors CA1 and CA2. This pulse is a signal that the switch ST has reached the home position. Relays 3 and 4 drop-out at the area panel and 3A and 4A are energized. Since at this time SS has reached the home position and relay 21 is deenergized 21*b* is opened. When 4A is energized, 4A*d* is opened and relay 9 drops out after an interval of 150 milliseconds. Relay 6 remains energized through 9*a* until 9 drops out and through 4A*e* until 4A drops out. At the end of this interval relay 6 becomes deenergized and drops out. Relay 7 then becomes deenergized and drops out after 500 milliseconds. When relay 7 drops out relay 2 is deenergized and drops out and the area panel and console step-switches ST and SS are reset.

During the 500 millisecond pulse, 4A*d* is open. Since SS is in the home position 21*b* is open, 9 is deenergized; 6 is then also deenergized.

At the console Z is deenergized. T is then deenergized and V is deenergized.

At this point relay 19–1 being actuated, contact 19–1*a* is opened and the lock-in circuit through relay 23 and through 18–1 II is open. Also relay 6 being deenergized, contact 6*a* is open and the lock-in circuit through 18–1*a* and 18–1 II is also open but so long as the alarm exists in the area 1 DE remains closed so that relay 18 remains actuated through DE. Relay 19–1 is set to operate when a restoration occurs. On energization of the LS and the LCS lamps the attendant notes the lamps and usually takes the necessary action to have the abnormal condition eliminated and then in most situations presses the "Acknowledge" button AK deenergizing the lamp LCS.

*Confirm operation*

The attendant at the console may be instructed to confirm soon after an alarm is indicated. The attendant then closes the "Confirm" switch. Contact SWC*a* is closed and contact SWC*b* is opened. If the step-switch ST is in the home position lamps LS and LCS are deenergized at SWC*b*.

The closing of SWC*a* actuates relay H in circuit 200, I*a*, M*b*, Z*b*, O*a*, SWC*a*, H, 201. B is then energized through H*c*. Relay A is then energized through B*b* and H*b*. Relay N is energized through H*c* and A*h* and prevents more than one operation of B.

On the energization of A, A*a* opens and B times out. Since G is deenergized at this time the console transmits to the corresponding area panel a pulse which drops to 0 magnitude and which has a duration of 100 milliseconds through conductors CA1 and CA2. The confirm switch SWC may now be released.

At the area panel relays 3 and 4 become deenergized and relays 3A and 4A become energized. Relay 10 is energized in circuit 100, 21*c*, 4A*i*, 6*d*, 3A*c*, coil 10, 101. Contact 10*a* drops out and all relays 19 are deenergized. At the end of the pulse relays 3 and 4 are again energized. Relay 10 is deenergized.

It has been assumed that there is an alarm in area 1. DE for area 1 is then closed and the above procedure for reporting and printing an alarm is repeated.

If the step-switch ST is away from the home position Z*b* is open and the "Confirm" does not take place in actuation of SWC. The opening of SWC*b* does not affect lamps LS and LCS because Z*g* is closed.

After the Confirm 19–1 is reoperated. The confirmed report has been printed. The attendant may operate Acknowledge AK to extinguish LCS. The alarm still persists after the step switches have returned home and contact DE still remains closed and relay 18–1 remains operated. But at this point the stepping of switch SS does not continue because contact 19–1*c* is open.

*Operation following restoration*

Area 1 is restored to normal when contact DE reopens and relay 18–1 drops out providing the holding circuits described above are open. The following circuit is now closed: 100, 18–1*e*, 19–1*e*, 3DX, 2*a*, coil 1, 101. Relay 1 is energized and conditions the step-switch SS to start a stepping operation. Bank SS*a* of step-switch SS is one step ahead of the other banks and when relay 1 is energized, 1*h* is closed and the following circuit is closed through the advanced bank SS*a*: 100, 18–1*e*, 19–1*b*, 353, 300, 1*h*, coil 16, 101. Relay 16 is then actuated. 16*a* is opened and since 1*d* and 1*e* are also open the current through CA1 and CA2 is reduced to zero.

At the console the current through I II and J are reduced to zero and both I and J operate (J is deenergized). I*e* and J*a* are closed and L is energized and locked through L*h* and A*d*. The printer is set to print in black. L*a* and L*c* are open and L*b* and L*d* closed so that when the capacitor 7C is discharged later, it deenergizes lamp LS because the voltage in the capacitor 7C causes the voltage on lamp LS to be reduced almost to zero.

With relay 16 and 1 operated at the area panel relays I and IA are operated at the console and the coil of step-switch ST is energized. Relay K is also actuated so that relay T is energized; in addition capacitors 7C and 5C are charged. Relay M is also energized and relay S is energized and the intelligence of the restoration and its time and date are printed in black.

At the area panel relay 2 is energized, relay 1 deenergized and the step-switch advances to the first step. At this point then current flows through 100, 18–1*e*, 19–1*e*, 601, of SS*b*, 41DX, 5*a*, 8*a* locking relay 2 in energized condition and stopping the step-switch at the first step. At this point also with relay 1 deenergized relay 16 drops out.

When SS stops no signals are transmitted to the console and relay K drops out. Lamp LS is deenergized as the reversed voltage on 7C is impressed across the lamp. If lamp LCS was deenergized by the closing of button AK it is again re-energized to indicate a change of state in the detectors.

Step-switch ST is in the first step and contact STH2 is closed. Relay Z is energized. When relay M becomes deenergized the circuit is closed to energize relay G. When relay G is energized a low current pulse is transmitted from the console to the area panel to indicate that the message has been printed. Relay L is dropped out at this time. This pulse causes 4 to be deenergized energizing 4A and 5. The energization of 4A with the step-switch in the first position causes current to flow in circuit 100, 4A*a*, 3A*k*, 500, 501, 19–1 I, 19–1*g*, 19–1 II and 101. The coils I and II of 19–1 now draw opposing ampere turns and relay 19 drops out. The step-switch SS now continues until it reaches the home position and the apparatus is reset. Likewise the step-switch ST is driven to the home position.

*Operation*

*Supervisory alarm.*—Relay 18–31 may be taken as typical of the supervisory alarm relays. Normally current flows through 18–31 I in circuit 100, 1R, 18–31 I, 33IR, 101 and through 18–31 II in circuit 100, 35R, DES, 18–31 II, 33IR. The ampere turns through the relays 18–31 I and 18–31 II are equal and opposite so that relay 18–31 is an unactuated condition. If a supervisory alarm should occur for area 31 the contact DES opens interrupting the current through 18–31 II. Relay 18–31 is then actuated.

With relay 18–31 actuated the above-described operation is repeated. Initially the step-switch SS is actuated in circuit 100, 15*a*, 18–31*d*, 19–31*a*, 4DX, 2*a*, coil 1, 101.

The step-switch continues to step until it reaches the 31st step. At this point the circuit is completed from 100, 15a, 18–31d, 19–31a, 631, 600, 41DX, 5a, 8a, coil 2, 101 and this locks in relay 2 and stops the stepping. Thereafter an operation very analogous to the above-described operation for the critical alarm at area 1 takes place.

*Operation priority channel V–10*

The channel including relay V–10 is a priority channel which is used to print defects in the system such as "out-of-sync," "line fault" or test. These conditions are indicated for the different consoles by the reclosing of contacts Y–1a or Y–2a (similar to Y in the console described above) or by the closing of RR–1a, RR–2a, E–1a or E–2a during the "test" of any of the consoles. The closing of any of these contacts closes the circuit through the coil of relay W which is as follows, 200, the closed contact, Ua, W, 299. W is then actuated and if the printer is available a circuit is closed through V–10 as follows (FIG. 3G): 200, Wa, V–10, 11DX10, V–2e, V–1e, V–10c, 299. Relay V–10 is locked in by contact V–10e. The energization of V–10 activates relay U through V–10g FIG. 3F). A circuit is also closed through the coil of relay SA in the console where the defect occurs as follows: 200, V–10a, 21DX, the closed contact (Ya, RRs, Et), SA, 201. The information is then printed in a circuit extending in the following circuit: 200, SAa, SAb, V–10b, the closed contact (Yk, Ym and RRa or Eh) to the printer. If there is a fault at the console the relay Y is deenergized and contact Yk is reclosed to indicate the line fault. On the other hand, if the "out-of-sync" occurs relay Y remains actuated and relay RR is energized so that the out-of-sync is printed through contacts Ym and RRa.

The actuation of relay U opens contact Ua in the circuit of coil W. W drops out at 500 milliseconds after its coil is deenergized. The intelligence of the defective condition is recorded while W times out. After W times out Wa opens and V–10 is deenergized. SA is then deenergized. Relay U remains actuated through Ub and the contact which originated the operation until the condition is restored to normal.

*Test operation*

It may be assumed in describing this operation that the apparatus is in stand-by. With the apparatus in stand-by the "test" push button SWT (FIG. 3E) at the console is closed. Relay E is energized in the following circuit: 200, Ia, Mb, Zb, Oa, Db, SWT, diode 23DX, coil E, 201. The relay E is locked in through Dc, Ec, coil E. When relay E is actuated Eb closes and relay G is actuated in the following circuit: 200, Ia, Mb, Zb, Oa, Db, SWT, Eb, coil G, 201. Relay contact Gd now closes and relay B is actuated and locks in through Ba and Aa. Since Gb and Bb are now closed relay A is actuated. Ah then closes actuating relay N in the following circuit; 200, Fc, Gd, Ah, coil N, 201. Relay N is locked through Nb. With relays A and N actuated Aa opens and relay B times out ultimately opening contact Bb and deenergizing relay A so that it times out. Since G is energized and Ga is closed a 100 millisecond pulse of reduced magnitude is transmitted along conductors CA1 and CA2. At this point SWT may be released.

The pulse of reduced magnitude along CA1 and CA2 causes relay 4 to drop out. Relay 4A is energized and relay 11 is then energized in the following circuit: 100, 21c, 4Ai, 6d, 3Ab, coil 11, 101. Contact 11a closes energizing all of the 18– relays, except 18–51. When 11e closes it energizes relay 12. Relay 12 in turn operates 18–51 in the normal manner, that is, as an electrical fault at 12a. This extends the test to relay 12 and battery B5. Contact 11b opens deenergizing any 19– relays which happen to be locked in through 11b and 10a. Alarms may be reported in the usual manner by the closing of contacts DE or the opening of contacts DES.

When E is actuated E–1a or E–2a is closed, U and W and V–10 are actuated and the word "test" is printed with date and time of the printing. This intelligence is printed in red.

With all 18 relays energized and all 19 relays deenergized the step-switches SS and ST operate through one complete round or cycle during which the 19– relays are energized, at the end of the cycle the 18– relays are deenergized. Alarms reported at this time are not printed. Although the alarms and restorations are not printed during test, for the test to proceed to completion in two cycles it is necessary to indicate to the area panel that the reports were printed. This is accomplished by operating G rather than H through 200, Ia, Mb, Zb, OA, SWT, Fb, G, 201. Relay E prevents the operation of relays T, V and S to prevent printing. When ST advances to the first step relay Z at the console is energized.

At the end of this first cycle of stepping of SS relay 6 is deenergized and relay 7 times out. A new round of operations of the switches SS and ST is started because the 18– relays are out and the 19– relays are energized. At the first pulse of this second round, relay 16 is actuated through 353 and 300 of SSa. Relay J is dropped out and relay I is actuated at the console. Relay L is actuated and locked in through Lh and Ad. Relay L is dropped out between the report of each restoration. As the step-switches SS and ST step around restorations are reported in black.

When the step-switch ST has completed its first step in the second round relay Z is actuated and relay D is energized in the following circuit (FIG. 3D): 200, Zi, Eu, Lj, coil D, 201. D is actuated and Dc opens but relay E remains locked in through Ze and Ec. Relay D is locked in through Hf and Dj. At the end of this second round when the step-switch ST reaches home, Ze opens. Relay E remains energized through Bd and Ec. After the console transmits the "at home" pulse, the holding circuit to relay E is opened and relay E drops out.

Relay H is energized in the following circuit: 200, Ia, Mb, Zb, Oa, Db, Ej, H, 201. The energization of H has the same effect as closing the "confirm" button SWC and the apparatus goes through a confirm operation to report any alarms which came in during the test.

*Printer not available*

Assume that there are two consoles and that an alarm occurs in a region under the supervision of console No. 2 while an alarm under the supervision of console No. 1 is being printed. Under such circumstances, contact V–1e is open and the actuation of relay V–2 is prevented. Thus the intelligence as to the alarm controlled by console No. 2 cannot be printed. The V relay of console No. 2 is then unactuated so that the H relay of console No. 2 is energized in circuit 200, Ia, Mb, Za, Vb, Ed, coil H, 201. Relay H then picks up but relay G remains deenergized.

Relay A picks up through Hb and Bb when B picks up after IA is actuated. Contacts Ab and Ac open. At this point contact Ga is also open so that a signal is transmitted through conductor CA1 and CA2 for which the magnitude is zero instead of the lower magnitude determined by resistor 6R when Ga is closed.

Since the pulse is zero both relays 3 and 4 are deenergized. Relay 3A and 4A are then both energized. While 4Aa closes 3Ak opens and the actuation of relay 19–1 of area panel 2 is prevented. Since relay 19–1 for area panel 2 is not actuated the operation of step-switch SS of area panel 2 when it reaches the home position is stopped only for about 1 second while 4A, 9, 6 and relay 7 operate. Then this reoperation continues until the printer becomes available and the intelligence of the occurrence in the region under the supervision of area panel 2 and console 2 is printed.

Out of synchronization operation

It may happen that during an operation SS and ST fall out of synchronism. Assume that SS is three steps in advance of ST; SS then arrives at the home position, three steps ahead of ST; that is, while ST is at position 49. When SS arrives at the home position, relay 2 is locked in through 21b and 7a. When the pulsing from the area panel stops because SS has arrived at the home position, K and M time out and an alarm is erroneously reported at position 49.

The closing of IAf energizes P and P locks in through Ad and Pa. Since ST has not reached the home position, Z is energized and, following the false report, relay G is energized followed by the energization of relays B and N and a signal of reduced current is transmitted through the area panel. This signal in effect is an indication that the area panel should continue since an alarm has been reported.

After the false signal is produced at the console, and A is energized in the process of transmitting a signal back to the area panel, Ad opens deenergizing P. O then starts to time out; O times out in 250 milliseconds.

At the area panel, relay 4 drops out on receiving the reduced current signal along the conductor CA1 and CA2 produced by the energization of relays A and G. Relay 4A is then energized. After the 100 millisecond reduced current pulse is terminated, relay 4 picks up. During this time, the stepping switch SS is in the home position so that 21b is closed. Since 7a is also closed relay 2 remains locked in and prevents the operation of relay 1 so that no pulses can be transmitted back to the console. When relay 4 is actuated, it picks up relay 5 and relay 5 locks in through 1g and 5b. Since relay 1 is not energized, relay 5 remains locked in and 5c remains closed.

When relay 4A becomes deenergized, after relay 4 becomes energized, the following circuit is closed through the coil of relay 10 (FIG. 2C): 100, 21c, 4A1, 9c, 5c, coil 10, 101. Relay 10 then becomes energized and all relays 19– which were maintained energized in the lock-in circuit through contacts 10a and 11b become deenergized.

At the console, relay O ultimately times out. When O times out relay R is actuated in the following circuit: 200, Zc, Pb, Ob, coil R, 201. Relay R locks in through 200, Zc, Rt, coil. The actuation of R closes Ri and ST begins to operate to step automatically on the opening and closing of STa.

In addition, when relay R is actuated Ra closed and relay RR is energized and is locked in through Ud, diode 31DX and RRc. V–10 is then actuated when the printer becomes available and the printer operates to print "out-of-sync" through Ym and RRa. In addition, the "out-of-sync" lamp LOS is energized in circuit 400, Rk, 3C, R1, 25R, LOS, 401. When the step-switch ST is motored to the home position, it sends back the "at home" signal and the apparatus is now returned to the normal mode of operation by the timing out of relays 9, 6 and 7.

If the step-switch ST is a step or more ahead of SS, ST reaches a step beyond home position when SS reaches home position and stops the signaling. Assume that ST has reached one step beyond home position. This would be the same as ST being 52 steps short of the home position when SS reaches the home position. The above-described operation for ST behind SS is then repeated.

Relay 8 provides an additional circuit for indicating a loss of synchronization. Assume that step switch ST stops at the home position while SS is away from the home position. The console will send a 500 millisecond pulse "at home" signal to the area panel. Since SS is away from home relay 21 is energized and 21g is open.

4A remains operated for 500 milliseconds and relay 8 is timed out. When SS arrives at the home position it operates relay 10 through 100, 21c, 4A1, 9c, 8c, coil 10, and 101. A uniform operation is thus carried out.

Ground operation

If either conductor 100 or 101 or any conductor connected to these through an electrically continuous path is grounded relay 12 is connected to ground through the battery B5 and is energized. Similarly, a ground in the console circuitry is detected by relay GD. The operation of relay 12 opens contact 12a actuating relay 18–51 and the resulting operation is similar to the operation during a supervisory alarm.

Area panel power supply failure

The failure of the power supply at the area panel to maintain at least 41 volts breaks down the Zener diode Z2 causing the battery B1 to operate relay PFA. Contact PFAc shorts out Z2 to eliminate the voltage drop which would exist across it. In addition, conductors 100 and 101 are connected to be supplied from the battery B1. Contact PFAa in the circuit of relay 18–51 is opened and the relay 18–51 produces an operation similar to the other supervisory alarm relay.

SS stalled away from home

SS is stalled away from home by the locking in of relay 2. Contact 2c in the energizing circuit for relay 14 is then opened. In addition, since ST is away from home, contact 21d is open. Relay 14 then times out. If the stalling persists for more than two seconds relay 14 drops out. Contact 14d in the circuit for relay 8 is then opened and relay 8 times out. Contact 8a is then opened deenergizing the lock-in circuit for relay 2 and the step-switch can operate again. Relay 8 remains dropped out so that contact 8b is closed. When the step-switch SS reaches the home position 21c closes energizing relay 10. This deenergizes all the 19– relays which happen to be locked in. When relay 10 is energized contact 10b closes re-energizing relay 8 and deenergizing relay 10. The effect is the same as if an "out-of-sync" signal had been produced and the intelligence which happens to have affected the 18– relays is repeated.

SS stalled at home

Step-switch SS may be stalled in the home position for a number of reasons and in a number of different ways. Typically it may be stalled because relay 6 remains energized after the step-switch reaches the home position, because relay 10 remains energized, or because an alarm has come in and relay 1 has failed to operate.

If following a report, relays SS and ST are in synchronism, a long pulse is transmitted to indicate that relay ST is in the home position and relay 4A is energized. Relay 9 then drops out deenergizing relay 6. The deenergization of relay 6 with relays 10 and 23 also deenergized leaves 22 energized. If relay 6 should remain energized, contact 6b would be open and relay 22 would begin to time out. If relay 6 remained energized for more than two seconds while SS is in the home position 22 would time out opening 22a and deenergizing relay 7. The deenergization of relay 7 would tend to permit relay 2 to be deenergized and the stepping of switch SS to take place.

If during an operation, relay 10 remains energized, contact 10d would be opened and relay 22 would time out as described above.

If an alarm came in, it operates one of the 18– relays and the 23 relay in the lock-in circuit. Under such circumstances 23b opens. Relay 7 is open at 6k since it is assumed that relay 6 has operated properly. If now, relay 1 fails to operate, to advance the step-switch the contact 1*j* remains open. With 23*b*, 1*j* and 7*g* open 22 times out. A circuit closes through 22*e* and 22*a* which would cause relay 1 to operate. Thus, the step-switch is then started and produces a normal operation. The pulse light PL pulses during normal operation of IA responsive to signals along CA1 and CA2. If relay 1 should stick in the open position or a low-current continuous pulse should be supplied for any other reason I would be actuated, IA*r* would open and PL would be extinguished indicating the defect.

*Alarm indicating circuits*

Relay 23 indicates an alarm as just described. Another relay which indicates an alarm is 15. Relay 15 is connected in circuit only with the critical alarm 18– relays. Assume that there is a fire alarm in the area 1 which controls relay 18–1. In this case, the following circuit is closed 100, 18–1*d*, 19–1*c*, 33DX, 14*f*, 15, 101. Relay 15 is then actuated. Contact 15*d* then closes closing a circuit through 15*d* and 2*a* so that relay 1 is actuated if it is not actuated in the other circuits. Thus, a stepping may be initiated through the contact 15*d* if it is not otherwise initiated. Relay 15 also gives priority to critical alarms over non-critical alarms in that when both exist simultaneously, critical alarms will be reported before non-critical alarms. If relay 15 is operated it prevents non-critical alarms from being reported by 15*a*. When the critical alarms are reported 15 drops out and the non-critical alarms may be reported.

The following summary may aid in the understanding of the invention and its advantages:

This invention is an automatic supervisory system which is used to monitor fire, security, and industrial equipment. This system signals normal as well as off-normal conditions. The following are important operating features of this new system:

(1) A check for synchronization is made during and at the end of each reporting cycle in the occurrence of an alarm. Any loss of synchronization is recorded, and correct data is retransmitted. This feature provides for reliable data transmission in the event of a momentary malfunction of the equipment.

(2) A "test" feature is provided which enables the operator to test the complete system with the exception of the detectors themselves. A printed record is made of the fact that the system was tested. This feature is desirable from the point of view of the insurance carrier in case of fire or security. The carrier desires a system checked periodically and a record made of each test.

(3) A "CONFIRM" operation is provided which enables the operator to cause all the standing data to be retransmitted and printed. This feature is desirable from the point of view of the plant management as management can insist that the operator confirm all important alarms. This feature provides supervision of the operator, as he is obliged to stay at the console because the time is printed of both the original alarm and the confirmed data.

(4) A precedence feature is provided which enables the system to bypass pre-selected alarms and respond immediately to the priority or critical alarms. The normal application of this feature is to have the reporting of supervisory alarms temporarily bypassed in the event that a fire alarm is registered.

(5) Automatic switching is provided in the event of trouble such as open circuit or faults on the lines which supply the fire detectors, as well as the communication link between the area panel and the console. As a result, an unskilled attendant may be employed to monitor and operate this system.

(6) Two visual displays for each detector are provided on the console. One display indicates the state of the detector, and the other display indicates that a detector has changed its state. These displays display information which is not readily available on other systems, and this provides for a system which is easily supervised by an unskilled person. The "state of the detector" display is a ready reference to the existing situation, while the "change of state" draws the attention of the operator to the detector which has recently changed. An "acknowledge" button is associated with each detector which, when operated, turns off the "change of state" display.

(7) A number of means are provided to operate the system under conditions of fault. This feature either provides data to be retransmitted or provides signals to the operator, informing him of difficulty. These emergency operating features give assurance that alarms or trouble will be brought to the attention of the operator.

(8) Incoming data from several area panels may be reported concurrently. But the printing of the incoming alarms, takes place sequentially from one area panel to the next. In this way, alarms may be displayed rapidly without having to wait for a relatively slow printer.

(9) The identification of a given station or detector is printed in two colors or other distinguishable identification: typically red when the detector moves to the off-normal state, and black when the detector is restored. This serves to identify readily incoming alarms.

While a preferred embodiment has been disclosed therein many modifications are feasible. This invention then is not to be restricted except insofar as is necessitated by the spirit of the prior art.

We claim as our invention:

1. A communication system for communicating condition of apparatus, said apparatus being normally in a first condition but being capable of being in a second condition, the said system comprising a transmitting station and a receiving station, means automatically responsive to the occurrence of said second condition for transmitting a signal to said receiving station, means at said receiving station responsive to said signal for producing a sensory indication of said second condition, and confirming means manually actuable at said receiving station for interrupting said indication and, if said second condition persists, for producing automatically a confirming transmission of said signal from said transmitting station reproducing said indication as it was initially produced at the inception of said second condition.

2. A communication system for communicating intelligence of an abnormal condition in any of a plurality of areas comprising a plurality of alarm relays, each relay corresponding to an area and being actuable on the occurrence of an abnormal condition in said last-named area, means responsive to actuation of said last-named alarm relay for producing an indication of the abnormal condition corresponding to said last-named alarm relay, a reported relay corresponding to each alarm relay, means connected to each reported relay for actuating said last-named reported relay, following said producing of said indication, means connected to said last-named reported relay for deactuating said reported relay on the restoration of said last-named area to normality, confirm means, and means responsive to actuation of said confirm means for deactuating said reported relays actuated prior to actuation of said confirm means although said restoration has not occurred at the corresponding areas.

3. A communication system for communicating intelligence of an abnormal condition in any of a plurality of areas comprising a plurality of alarm relays, each relay corresponding to an area and being actuable on the occurrence of an abnormal condition in said last-named area, means responsive to actuation of said last-named alarm relay for producing an indication including a continuous sensory signal of the abnormal condition corresponding to said last-named alarm relay, a reported relay corresponding to each alarm relay, means connected to each reported relay for actuating said last-named reported relay, following said producing of said indication, means connected to said last-named reported relay for deactuating said reported relay on the restoration of said last-named area to normality, confirm means, and means responsive to actuation of said confirm means for deactuating said reported relays actuated prior to actuation of said confirm means although said restoration has not occurred at the corresponding areas and for discontinuing said signal, said last-named alarm relay remaining actuated if said abnormal condition persists in said last-named area, and means responsive to said continued actuation of said last-named alarm relay for repeating said indication of said abnormal condition.

4. A communication system for communcating intelligence of an abnormal condition in any of a plurality of areas comprising a plurality of alarm relays, each relay corresponding to an area and being actuable on the occurrence of an abnormal condition in said last-named area, means responsive to actuation of said last-named alarm relay for producing an indication including an inscribed record of the abnormal condition corresponding to said last-named alarm relay, a reported relay corresponding to each alarm relay, means connected to each reported relay for actuating said last-named reported relay, following said producing of said indication, means connected to said last-named reported relay for deactuating said reported relay on the restoration of said last-named area to normality, confirm means, and means responsive to actuation of said confirm means for deactuating said reported relays actuated prior to actuation of said confirm means although said restoration has not occurred at the corresponding areas, said last-named alarm relay remaining actuated if said abnormal condition persists in said last-named area, and means responsive to said continued actuation of said last-named alarm relay for repeating said inscribed record of said abnormal condition.

5. A communication system for communicating intelligence of an abnormal condition in any of a plurality of areas on a console remote from said areas, the said system including an alarm relay corresponding to each said area actuable on the occurrence of an abnormal condition at said last-named area, said alarm relays being on an area panel remote from said console, means on said console responsive to actuation of an alarm relay for producing an indication of said abnormal condition, a reported relay on said area panel corresponding to each said alarm relay, means for actuating the reported relay corresponding to said last-named alarm relay following producing of said indication, means connected to said last-named reported relay for deactuating said reported relay on the restoration of said last-named area to normality, confirm means at said console, and means responsive to actuation of said confirm means for deactuating all actuated reported relays although said restoration has not occurred at the corresponding areas.

6. A communication system for communicating the condition of apparatus, said apparatus being normally in a first condition but being capable of being in a second condition and of being converted from said second condition to said first condition, the said system comprising a plurality of detectors connected to said apparatus actuable on the occurrence of a transition from said first condition to said second condition and being reset on the restoring of said apparatus from the second condition to the first condition, a transmitting station and a receiving station, means responsive to actuation of a detector on the transition of said apparatus to said second condition for actuating said transmitting station to transmit a first signal to said receiving station, means responsive to the resetting of said actuated detector on the restoration thereafter of said apparatus from said second condition to said first condition for actuating said transmitting station to transmit a second signal to said receiving station, a first sensory indicator and a second sensory indicator corresponding to each detector, means responsive to said first signal for actuating the first sensory indicator corresponding to the actuated detector to produce at said receiving station, a first sensory indication of said second condition of said apparatus to the extent that said second condition is detected by said actuated detector, and means responsive to said first signal and to said second signal for actuating said second sensory indicator corresponding to the actuated detector, to produce a second separate sensory indication of the transition of said apparatus respectively from said first condition to said second condition to the extent only that the second condition is detected by the actuated detector and from said second condition to said first condition to the extent only that the first condition is detected by the resetting of the actuated detector, said second sensory indication being separately identifiable from said first indication as an indication of said transitions and not as an indication of the existence of a said condition.

7. The communication system of claim 6 including an indicator for producing the first indication, the indicator being in a standby setting while the first condition exists and producing said first indication responsive to the first signal while the second condition exists, as described in claim 6, the said system also including means responsive to the transition of the system from said second to said first condition for automatically reverting said indicator from said first indication to said standby setting.

8. The system of claim 6 including a lock-in circuit for the second sensory indication and manual means only for opening said lock-in circuit.

9. The system of claim 6 including a lock-in circuit for the second sensory indication capable of being opened only manually and also including confirming means connected to the transmitting means and the receiving means and manual means for actuating said confirming means to confirm a transition from a first to a second condition, said manual means including means for interrupting both the first and the second indication.

10. The system of claim 6 wherein the first sensory indication and the second sensory indication are visual and are produced by a first lamp and a second lamp, said lamps being juxtaposed to each other so that the first and second indications can be related.

11. A communication system for apparatus having a normal and an off-normal condition comprising detecting means operative on the occurrence of an off-normal condition, transmitter means, receiver means, said transmitter means including first means actuable by operation of said detecting means to communicate intelligence concerning said off-normal condition to said receiver means, said receiver means including means responsive to the receipt of said intelligences, by said receiver means, for producing an indication of said off-normal condition and reply means actuable by receipt of said intelligence to transmit to said transmitter means reply intelligence concerning said receipt of said intelligence concerning an off-normal condition, said transmitter means also including second means actuable by operation of said detecting means substantially simultaneously with actuation of said first means, said second means being reverted to unactuated condition on receipt by said transmitter of said reply intelligence, and alternative means at said transmitter means, operable, after a predetermined interval of time, responsive to the continuous actuation of said second means for at least said predetermined interval of time, to communicate said intelligence concerning said off-normal condition to said receiver means.

References Cited by the Examiner

UNITED STATES PATENTS

| | | | |
|---|---|---|---|
| 1,762,906 | 6/1930 | Willoughby | 340—226 X |
| 1,996,268 | 4/1935 | Ambuhl et al. | 340—226 |
| 2,401,729 | 6/1946 | Goldsmith | 340—147 |

(Other references on following page)

UNITED STATES PATENTS

| | | | |
|---|---|---|---|
| 2,905,520 | 9/1959 | Anderson | 346—34 |
| 2,952,836 | 9/1960 | Hawley | 340—226 X |
| 2,965,881 | 12/1960 | Derr et al. | 340—226 X |
| 3,009,137 | 11/1961 | Cassell | 340—214 |
| 3,107,340 | 10/1963 | Silliman et al. | 340—226 X |
| 3,135,946 | 6/1964 | Miller et al. | 340—147 |
| 3,141,128 | 7/1964 | Behr | 324—51 |
| 3,155,950 | 11/1964 | Foster | 340—213.2 |
| 3,176,283 | 3/1965 | Shanahan | 340—213 |
| 3,188,392 | 6/1965 | Ferrell. | |
| 3,189,882 | 6/1965 | Ward | 340—213 |
| 3,202,978 | 8/1965 | Lewis | 340—286 |
| 3,219,991 | 11/1965 | Freitas | 340—213.2 |

NEIL C. READ, *Primary Examiner.*

THOMAS B. HABECKER, *Examiner.*

D. YUSKO, R. M. ANGUS, *Assistant Examiners.*